(12) United States Patent
Ström

(10) Patent No.: US 8,837,842 B2
(45) Date of Patent: Sep. 16, 2014

(54) MULTI-MODE PROCESSING OF TEXTURE BLOCKS

(71) Applicant: Telefonaktiebolaget L M Ericsson (publ), Stockholm (SE)

(72) Inventor: Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/920,418

(22) Filed: Jun. 18, 2013

(65) Prior Publication Data

US 2013/0279822 A1   Oct. 24, 2013

Related U.S. Application Data

(63) Continuation of application No. 13/189,973, filed on Jul. 25, 2011, now Pat. No. 8,494,291.

(51) Int. Cl.
*G06K 9/36*    (2006.01)
*G06T 11/40*   (2006.01)
*G06T 9/00*    (2006.01)

(52) U.S. Cl.
CPC .. *G06T 9/00* (2013.01); *G06T 11/40* (2013.01)
USPC ........... 382/232; 382/234; 382/235; 348/586; 348/587; 348/588

(58) Field of Classification Search
USPC ......... 382/233, 248, 232, 168, 234, 235, 167, 382/169, 274, 171, 260, 282; 345/582, 583, 345/584, 585, 586, 587, 588, 552, 538, 555
See application file for complete search history.

(56) References Cited

U.S. PATENT DOCUMENTS

| | | | |
|---|---|---|---|
| 6,298,169 B1 | 10/2001 | Guenter | |
| 6,452,602 B1 * | 9/2002 | Morein | 345/555 |
| 6,819,793 B1 * | 11/2004 | Reshetov et al. | 382/166 |
| 6,959,110 B1 * | 10/2005 | Danskin et al. | 382/166 |
| 7,397,946 B2 * | 7/2008 | Reshetov et al. | 382/166 |
| 7,885,469 B2 * | 2/2011 | Wang et al. | 382/232 |
| 2004/0151372 A1 * | 8/2004 | Reshetov et al. | 382/166 |
| 2012/0288210 A1 * | 11/2012 | Chen et al. | 382/233 |
| 2013/0009977 A1 * | 1/2013 | Strom | 345/586 |

FOREIGN PATENT DOCUMENTS

| | | |
|---|---|---|
| WO | 2010082886 A1 | 7/2010 |
| WO | 2011065886 A1 | 6/2011 |

* cited by examiner

*Primary Examiner* — Mekonen Bekele
(74) *Attorney, Agent, or Firm* — Coats & Bennett, PLLC

(57) ABSTRACT

Multi-mode decoding and encoding of texture blocks are disclosed wherein in a default decoding and encoding mode all bits of a codeword sequence are available as payload bits for representing texel values of the texels in the texture block. In an auxiliary encoding and decoding mode one less bit of the codeword sequence is available as payload bits. The auxiliary mode is employed as a complement to the default mode and will be used to process those texture blocks, which the default mode handles poorly.

6 Claims, 10 Drawing Sheets

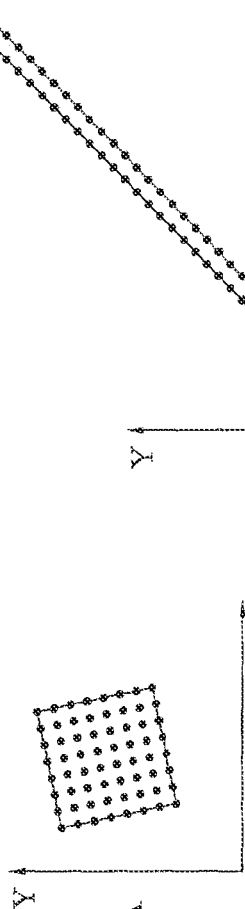
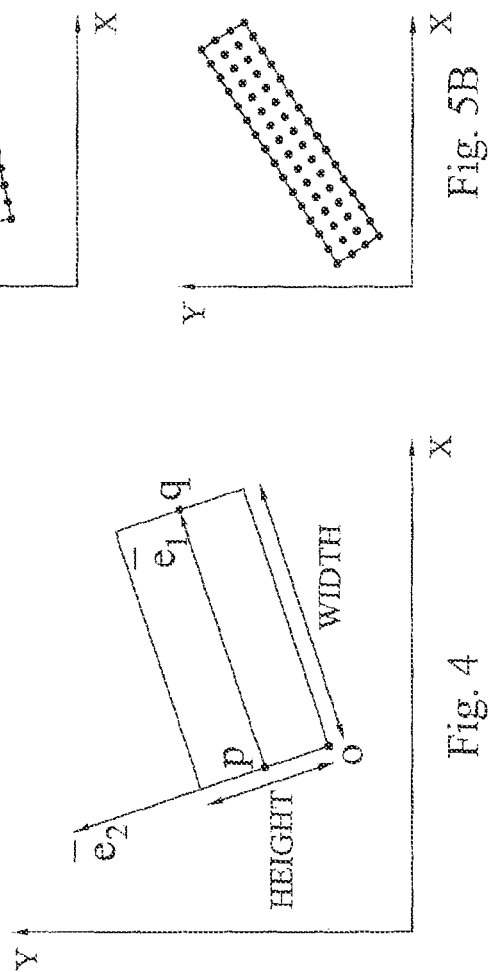
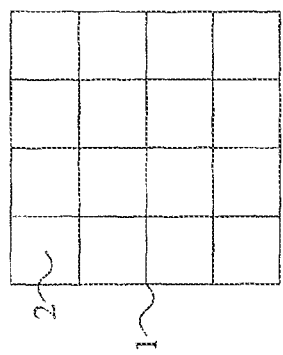
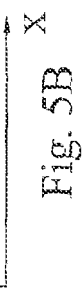

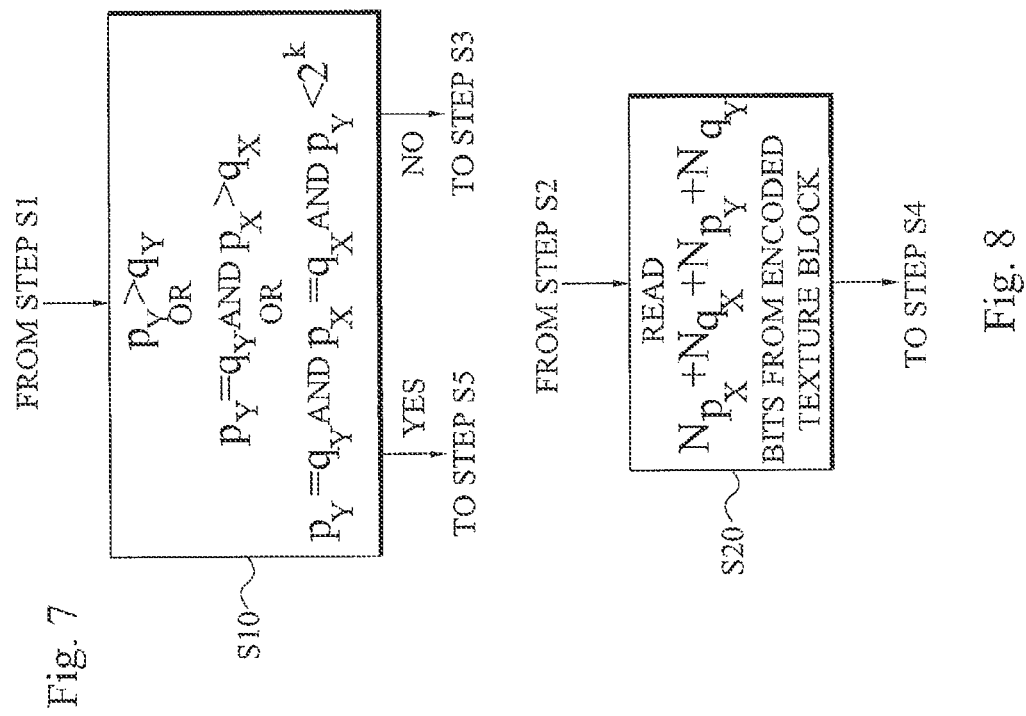
Fig. 7
Fig. 8
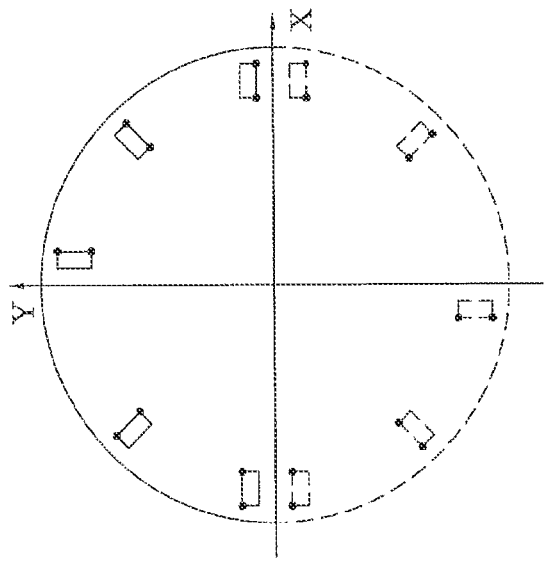
Fig. 6

US 8,837,842 B2

MULTI-MODE PROCESSING OF TEXTURE BLOCKS

RELATED APPLICATIONS

The present application is a divisional of U.S. patent application Ser. No. 13/189,973, which was filed on Jul. 25, 2011, which application claims priority to the International Patent Application identified by serial number PCT/SE2011/050935 and filed Jul. 8, 2011, the entire contents of which are incorporated herein by reference.

TECHNICAL FIELD

The embodiments generally relate to the processing of texture blocks, and in particular to multi-mode encoding and decoding of such texture blocks.

BACKGROUND

The real-time rendering of three-dimensional (3D) graphics has a number of appealing applications on mobile terminals, including games, man-machine interfaces, messaging and m-commerce. Since 3D rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture encoding or compression. Texturing refers to the process of "gluing" images denoted textures onto the rendered triangles. The textures consist of a number of texture elements or so-called texels in correspondence to picture elements or pixels of a picture. If the textures are encoded in memory, and then during accessing they are decoded or decompressed, a significant amount of bandwidth usage can be avoided.

Most texture processing schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each texel to perturb the surface normal. A common approach to generate normal maps is to start with a high polygon count model and create a low complexity model using some geometrical simplification algorithm. The "difference" between these two models is then "baked" into a normal. For real-time rendering, the normal map is applied to the low complexity model, giving it a more detailed appearance.

Using lower polygon-count models is of course very attractive for mobile devices, since they have lower computational performance than PC and computer systems.

However, one problem is that the texture processing schemes available are created with photographic images in mind and do not work well when the data is something else, such as a normal map. For example, the lossy texture compression algorithm S3 Texture Compression (S3TC), also denoted as DXTC or DXTn in the art, wherein n denotes the version number of the compression algorithm, has been employed for compressing normal maps, however, with block artifacts as a result. See, e.g., U.S. Pat. No. 5,956,431.

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X,Y,Z), where $X^2+Y^2+Z^2=1$. The simplest scheme, is just to treat X,Y,Z as RGB (Red, Green, Blue) and compress it with S3TC/DXT1, but that gives rather bad quality.

Another way is to only compress X and Y, and then compute Z using equation 1:

$$Z = \sqrt{1-X^2-Y^2} \quad (1)$$

By concentrating on X and Y it is possible to get a lower distortion. In order to enhance quality further, the compression algorithm version DXT5 can be used. Normally DXT5 is a version of S3TC used for alpha textures, i.e. RGBA textures, where RGB are coded together and the alpha component (A) is coded independently. Thus one approach has been to use the alpha channel to code X and the G channel to code Y. R and B has been unused in order to give maximum quality to G. However, that still does not give enough quality.

Actually, for smooth surfaces it turns out that even uncompressed RGB888/XYZ888 does not give enough quality for some objects. Especially for smooth surfaces, more than eight bits are needed. Improved normal map processing schemes have therefore been proposed in the art. See, e.g., Munkberg et al, High Quality Normal Map Compression, *Graphics Hardware* (2006), ACM Press, pp. 96-101, and Munkberg et al., Tight Frame Normal Map Compression, Graphics Hardware (2007), ACM Press, pp. 37-40.

However, there is still a need for a texture processing scheme that can used to efficiently encode and compress textures, including normal or bump maps, and decode and decompress encoded textures.

SUMMARY

It is a general objective to provide a multi-mode encoding and decoding of texture blocks.

This and other objectives are met by embodiments as disclosed herein.

An aspect of the embodiments relates to a multi-mode method of decoding an encoded texture block. The method comprises selecting between a default decoding mode and an auxiliary decoding mode for the encoded texture block. This mode selection is performed by comparing a first bit sequence and a second bit sequence of the encoded texture block, comparing a third bit sequence and a fourth bit sequence of the encoded texture block and by comparing the third bit sequence with a predefined value. If the default decoding mode is selected for the encoded texture block a codeword sequence of $N_{p_X}+N_{q_X}+N_{p_Y}+N_{q_Y}$ is extracted from the encoded texture block. However, if the auxiliary decoding mode instead is selected a codeword sequence of $N_{p_X}+N_{q_X}+N_{p_Y}+N_{q_Y}-1$ bits is extracted from the encoded texture block, wherein $N_{p_X}$ represents the number of bits of the first bit sequence, $N_{q_X}$ represents the number of bits of the second bit sequence, $N_{p_Y}$ represents the number of bits of the third bit sequence and $N_{q_Y}$ represents the number of bits of the fourth bit sequence. A decoded texel value is then generated for at least one of the texels, i.e. texture elements, in the texture block based on the extracted codeword sequence.

Another aspect of the embodiments defines a multi-mode decoder for decoding an encoded texture block. The multi-mode decoder comprises a mode selector configured to select between the default decoding mode and the auxiliary decoding mode for the encoded texture block by comparing the first and second bit sequences of the encoded texture block, comparing the third and fourth bit sequences of the encoded texture block and by comparing the third bit sequence with the predefined value. A codeword sequence extractor is configured to extract a codeword sequence of $N_{p_X}+N_{q_X}+N_{p_Y}+N_{q_Y}$ bits from the encoded texture block if the mode selector has selected the default decoding mode. If the mode selector instead selected the auxiliary decoding mode for the encoded texture block the codeword sequence extractor extracts a codeword sequence of $N_{p_X}+N_{q_X}+N_{p_Y}+N_{q_Y}-1$ from the encoded texture block. A texel value generator processes the codeword sequence from the codeword sequence extractor in order to generate a decoded texel value for at least one of the texels in the texture block.

A further aspect of the embodiments relates to a multi-mode method of encoding a texture block comprising multiple texels each having a respective texel value. The method comprises defining an auxiliary mode space encompassing bit sequence combinations of a first, second, third and fourth bit sequence. The auxiliary mode space encompasses bit sequence combinations where an integer value represented by the third bit sequence is larger than an integer value represented by the fourth bit sequence, or ii) the integer value represented by the third bit sequence is equal to the integer value represented by the fourth bit sequence and an integer value represented by the first bit sequence is larger than an integer value represented by the second bit sequence, or iii) the integer value represented by the third bit sequence is equal to the integer value represented by the fourth bit sequence, the integer value represented by the first bit sequence is equal to the integer value represented by the second bit sequence and the integer value represented by the third bit sequence is within a predefined value interval. The method also involves defining a default mode space that is complementary to the auxiliary mode space and encompasses bit sequence combinations of the first, second, third and fourth bit sequences that are not encompassed by the auxiliary mode space.

At least one default encoded texture block is generated for the texture block. The default encoded texture block represents the texture block with a combination of the first to fourth bit sequences selected from the default mode space. Correspondingly, at least one auxiliary encoded texture block is generated to represent the texture block with a respective combination of the first to fourth bit sequences selected from the auxiliary mode space. A default error indicative of representing the texture block with a default encoded texture block is estimated for each generated default encoded texture block. A corresponding auxiliary error indicative of representing the texture block with an auxiliary encoded texture block is estimated for each generated auxiliary encoded texture block. An encoded texture block resulting in a smallest error is selected from the default and auxiliary encoded texture blocks based on the estimated default and auxiliary errors.

Yet another aspect of the embodiments defines a multi-mode encoder configured to encode a texture block. The multi-mode encoder comprises a default generator configured to generate at least one default encoded texture block by representing the texture block with a respective combination of the first to fourth bit sequences selected from the default mode space. A default estimator is configured to estimate a default error for each default encoded texture block generated by the default generator. A default error is indicative of representing the texture block with a default encoded texture block. The multi-mode encoder also comprises an auxiliary generator configured to generate at least one auxiliary encoded texture block by representing the texture block with a respective combination of the first to fourth bit sequences selected from the auxiliary mode space. An auxiliary estimator is configured to estimate a respective auxiliary error for each auxiliary encode texture block generated by the auxiliary generator. An auxiliary error is indicative of representing the texture block with an auxiliary encoded texture block. A block selector selects an encoded texture block among the generated default and auxiliary encoded texture blocks. The block selector in particular selects the encoded texture block resulting in a smallest error as determined based on the estimated default and auxiliary errors.

The present embodiments complement a default encoding and decoding of texture blocks with an auxiliary encoding and decoding mode that can be used to handle those texture blocks which the default mode handles poorly. According to the embodiments, the multi-mode encoding and decoding maximize the number of useful payload bits that are available for representing the texel values both in the default mode and in the auxiliary mode but still enable a differentiation between the default and auxiliary modes.

BRIEF DESCRIPTION OF THE DRAWINGS

The invention, together with further objects and advantages thereof, may best be understood by making reference to the following description taken together with the accompanying drawings, in which:

FIG. 2 is schematic example of a texture block;

FIGS. 3A and 3B schematically illustrate the distribution of codewords in an encoded texture block generated according to a default encoding mode (FIG. 3A) and an auxiliary encoding mode (FIG. 3B) according to an embodiment;

FIG. 4 is schematic drawing illustrating the definition of allowable texel values for a texture block according to an embodiment;

FIGS. 5A to 5C are schematic drawings of having different aspect ratios for allowable texel values for a texture block according to various embodiments;

FIG. 6 is a drawing illustrating the concept of having redundant codeword combinations for encoded texture blocks;

FIG. 7 is a flow diagram illustrating the decoding mode selecting step of FIG. 1 according to an embodiment;

FIG. 8 is a flow diagram illustrating the extracting step S3 of FIG. 1 according to an embodiment;

DETAILED DESCRIPTION

Figure 1:
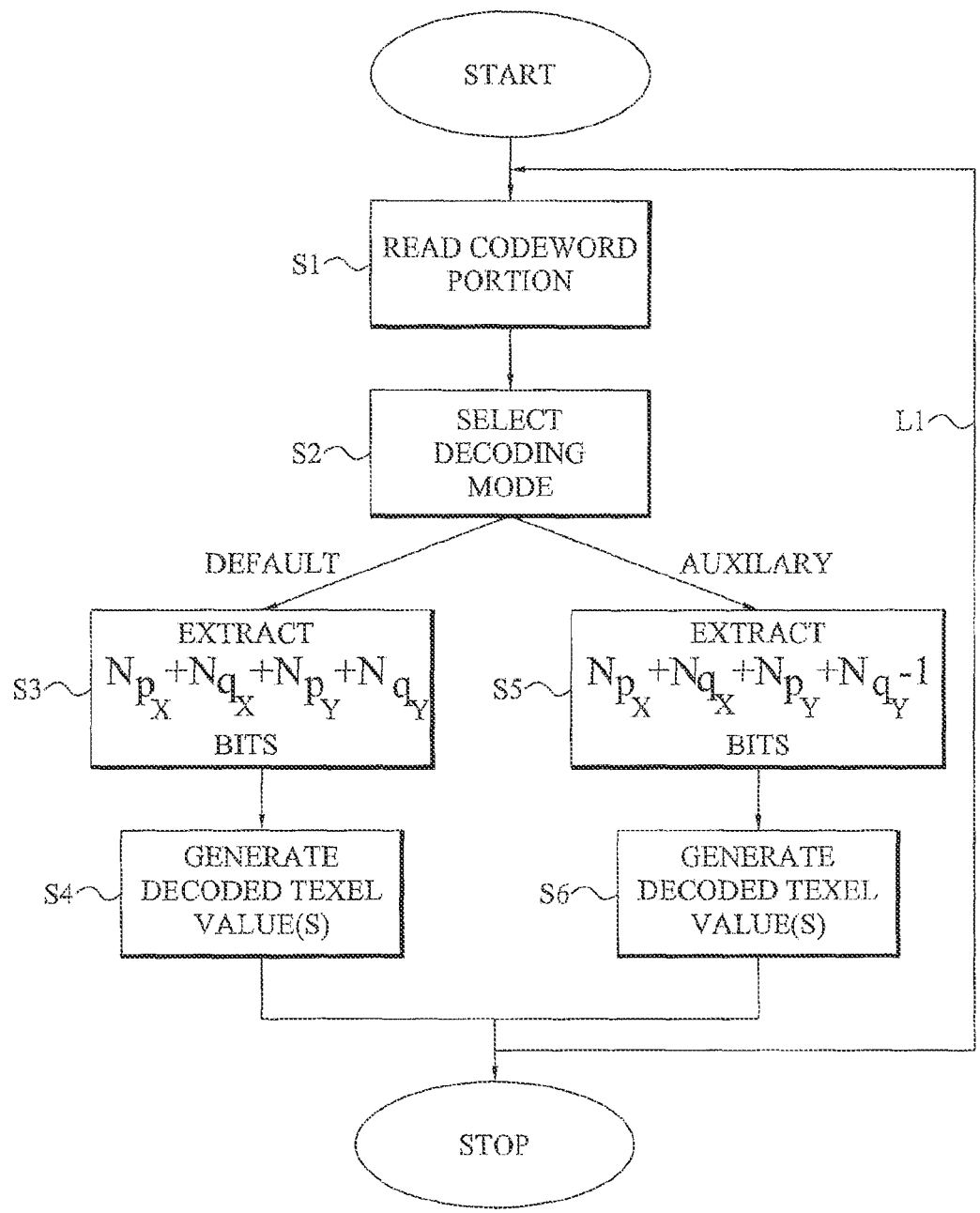
FIG. 1 is a flow diagram illustrating a multi-mode decoding method according to an embodiment.

Throughout the drawings, the same reference numbers are used for similar or corresponding elements.

The present embodiments relate to image and graphic processing, and in particular to encoding or compressing textures and textures blocks and decoding or decompressing encoded (compressed) textures and texture blocks.

Generally, according to the embodiments, during encoding, a texture is decomposed or divided into a number of texture blocks 1 or tiles, see FIG. 2. Each such texture block 1 then comprises multiple so-called texture elements or texels 2 having respective texel features or characteristic. The texture blocks 1 are encoded to generate an encoded representation of the texture.

When an encoded texture subsequently is to be rendered the relevant texels of the encoded texture blocks are identified and decoded. These decoded texels are then used to generate a decoded representation of the texture.

The embodiments are well adapted for usage with three-dimensional (3D) graphics, such as games, 3D maps and scenes, 3D messages, e.g. animated messages, screen savers, man-machine interfaces (MMIs), etc., but is not limited thereto. Thus, the embodiments could also be employed for encoding and decoding other types of textures or graphics.

The embodiments are in particular suitable for handling bump or normal maps. As is well-known in the art, a normal or surface normal denotes a 3D vector which is perpendicular to the surface, for a flat surface, or perpendicular to the tangent plane of the surface, for a non-flat surface.

Herein, texel refers to an element in a texture block or encoded texture block. This texture block, in turn, corresponds to a portion of a texture. Generally, a texel is characterized by a certain texel value representing a texel property or feature. In a preferred embodiment, each texel has a feature vector representing a feature associated with the texels. This feature could control or influence the appearance of a texel, such as a surface normal, or may represent a feature of the texel itself, such as chrominance information or color. A first such example of such a feature or texel vector is a normal, preferably a normalized surface normal. Such a surface normal has three vector components or coordinates, i.e. X-, Y- and Z-components. However, it is generally enough to only specify two of the normal coordinates, such as X- and Y-coordinates per texel, as the remaining coordinate can be calculated therefrom, such as using equation 1 above. As a consequence, the preferred feature vector of this embodiment is a two-dimensional (2D) feature vector specifying two of the coordinates, such as the X- and Y-coordinates.

A second example of a feature vector is a chrominance vector in a color space. In the art of texture processing, multiple different such color spaces have been employed, for example RGB, YUV or YCrCb space. In such a case, the feature vector preferably has three vector components, for instance, a red component, a green component and a blue component.

Furthermore, in the following, the term "texture" is used to denote any image or texture that can be encoded and decoded by means of the present embodiments, including but not limited to bump maps, normal maps, photos, game type textures, text, drawings, high dynamic range images and textures, etc.

The present embodiments provide a texture processing that is in particular suitable for encoding and decoding textures and texture blocks, where each texel has a 2M-dimensional feature vector, where M is a positive integer equal to or larger than one. Thus, each texel has an even-dimensional feature vector. In particular embodiments, the feature vector is a 2D feature vector, i.e. comprising two vector components. In a preferred implementation, the two vector components represent two coordinates of a normalized surface normal, such as the X- and Y-coordinates (or X- and Z-coordinates or Y- and Z-coordinates).

The embodiments are directed towards a multi-mode encoding and decoding where a default encoding and decoding mode is complemented with at least one additional or auxiliary mode. According to the embodiments, this at least one auxiliary mode comes for free without sacrificing any of the symbols, typically bits, employed in the default mode in order to represent the texels of a texture block. This is possible by exploiting inefficiencies and redundancies present in the default mode. Hence, the embodiments are able to introduce the auxiliary mode(s) at no cost with regard to the default mode and can thereby complement the default mode with at least one auxiliary mode that can be used to encode and decode "troublesome" texture blocks, which the default mode handles poorly.

In addition, the multi-mode encoding and decoding maximize the number of useful payload bits that are available for representing the texel values both in the default mode and in the auxiliary mode but still enable a differentiation between the default and auxiliary modes.

Decoding

FIG. 1 is a flow diagram illustrating a method of decoding an encoded texture block according to an embodiment. The encoded texture block comprises a codeword portion that is an encoded representation of the texel values, i.e. feature vectors, in the texture block. This codeword portion is interpreted in a default decoding mode as consisting of four bit sequences or codewords. The codeword portion is read from the encoded texture block in step S1 in order to retrieve the four bit sequences. The first, second, third and fourth bit sequences are then processed in step S2 in order to select a decoding mode for the encoded texture block. The selection between the so-called default decoding mode and an auxiliary decoding mode in step S2 is performed by comparing a first bit sequence and a second bit sequence of the codeword portion, comparing a third bit sequence and a fourth bit sequence of the codeword portion and by comparing the third bit sequence with a predefined value.

If the comparisons of the bit sequences performed in step S2 concludes that the present encoded texture block should be decoded according to the default decoding mode the method continues from step S2 to step S3. This step S3 extracts a codeword sequence of $N_{p_X}+N_{q_X}+N_{p_Y}+N_{q_Y}$ bits from the encoded texture block, where $N_{p_X}$ represents the number of bits of the first bit sequence, $N_{q_X}$ represents the number of bits of the second bit sequence, $N_{p_Y}$ represents the number of bits of the third bit sequence and $N_{q_Y}$ represents the number of bits of the fourth bit sequence. This means that in the default decoding mode all of the bits in the codeword portion are available and can be used to represent the texel values of the texture block.

The encoded texture block is then decoded in step S4 by generating a decoded texel value for at least one texel in the texture block, preferably by generating decoded texel values for all the texels in the texture block, based on the extracted codeword sequence of $N_{p_X}+N_{q_X}+N_{p_Y}+N_{q_Y}$ bits. The decoding of the texel values in step S4 is performed according to a defined default mode, which can be any known texel decoding mode which employs four bit sequences to define a box in the texel feature space, i.e. in the vector space.

However, if the auxiliary decoding mode is instead selected in step S2 based on the comparisons of the bit sequences, the method instead continues step S5. Step S5 extracts $N_{p_X}+N_{q_X}+N_{p_Y}+N_{q_Y}-1$ bits from the encoded texture block. This means that in the auxiliary mode one less bit of the codeword portion is available and can be used to represent the texel values of the texture block.

The encoded texture block is decoded in step S6 by generating decoded texel value, such as decoded feature vector, for at least one texel, preferably for all texels, in the texture block based on the extracted $N_{p_X}+N_{q_X}+N_{p_Y}+N_{q_Y}-1$ bits of the codeword sequence. The decoding of the texel values in step S6 is performed according to an auxiliary mode, which is employed as a complement to the default mode and is used for those texture blocks that the default mode handles poorly.

The method then ends or continues by decoding another encoded texture block of the texture, which is schematically illustrated by the line L1. It is possible that all of the texture blocks in the texture are encoded according to a default encoding mode or an auxiliary encoding mode and are therefore decoded as shown by steps S3 and S4 or by steps S5 and S6. However, in a typical application of the embodiments a texture comprises some texture blocks that are encoded by the default encoding mode and will therefore be decoded as shown by steps S1, S2, S3 and S4 of FIG. 1 and other texture blocks that are encoded by the auxiliary encoding mode and are therefore decoded as in steps S1, S2, S5 and S6 of FIG. 1.

A texture can be encoded in a serial process where the method steps of FIG. 1 are performed on one texture block at a time. If desired it is, though, possible to decode at least two encoded texture blocks at least partly in parallel.

The present embodiments are able to complement a default mode with at least one additional or auxiliary mode to handle those texture blocks that the default mode handles poorly. The embodiments additionally maximize the number of useful payload bits that are available for representing the texel values both in the default mode and in the auxiliary mode but still enable a differentiation between the default and auxiliary modes. This means that according to the embodiments no dedicated mode codeword or bit is required in order to signal the default mode or the auxiliary mode. Such mode bits are traditionally employed in the art but then steal at least one useful bit in both the default mode and the auxiliary mode. The embodiments are capable of differentiating between the at least two processing modes but without any such mode bits. Hence, the number of useful payload bits available in the processing modes is maximized.

In the following the present embodiments will be described in more detail in connection with particular embodiments of the default and auxiliary decoding modes. These embodiments should, however, merely be seen as illustrative but preferred implementation examples.

FIGS. 3A and 3B illustrate the bit sequence of an encoded texture block 10. The encoded texture block 10 comprises a codeword portion 11-14 that comprises four bit sequences 11, 12, 13, 14 that are interpreted, according to the default decoding mode, as X and Y coordinates of two different points $p=(p_X, p_Y)$, $q=(q_X, q_Y)$. The encoded texture block 10 additionally comprises an aspect ratio codeword or representation 15 and two index sequences 16, 17 one representing X indices and the other representing Y indices of the texels in the texture block. According to the auxiliary decoding mode, the codeword portion 11-14 and the aspect ratio codeword 15 are interpreted as an X coordinate, a Y coordinate and a length codeword or representation (L). The encoded texture block 10 additionally comprises the X and Y index sequences 16, 17.

In a particular embodiment, the encoded texture block 10 comprises 128 bits. These 128 bits can be distributed so that the first bit sequence 11, the second bit sequence 12, the third bit sequence 13 and the fourth bit sequence 14 each comprises 7 bits. The aspect ratio codeword 15 could be of 4 bits leaving in total 6 bits for the X and Y indices for each of texel in the texture block if a 4×4 texels size is assumed for the texture block as illustrated in FIG. 2. According to the auxiliary decoding mode, the index sequences 16, 17 each carry a 3-bit index per texel in the texture block. This leaves 31 bits to spend on the X-coordinate, the Y-coordinate and the length codeword. In an embodiment, 11 bits are each spent on the X-coordinate and the Y-coordinate with 9 bits for the length codeword. In an alternative approach, the length codeword comprises 8 bits with 11 bits for one of the X-coordinate and the Y-coordinate and 12 bits for the other of the X-coordinate and the Y-coordinate.

The above exemplified bit lengths of the different sequences of the encoded texture block should merely be seen as illustrative examples and can be selected to other values for other target bit lengths, such as 64 bits or 256 bits instead of 128 bits, and for other texture block sizes, such as 4×2 texels, 2×4 texels, 4×8 texels, 8×4 texels or 8×8 texels, as illustrative examples. Also texture block sizes that are not a power of two can be used, such as 3×3 texels, 5×5 texels, 6×6 texels or 7×7 texels.

The order of the bit sequences, codewords and indices of the encoded texture block does not necessarily have to be the one illustrated in FIGS. 3A and 3B. Furthermore, the denotation first to fourth bit sequence as used herein does not necessarily indicate the order at which these four bit sequences are organized in the encoded texture block. The denotation should rather be interpreted that the first and second bit sequences are compared with each other and the third and fourth bit sequences are compared with each other. As is further disclosed herein, the first to fourth bit sequences preferably represent the X and Y coordinates of two points or vectors when interpreted according to the default mode. In such a case, the comparisons of bit sequences are preferably conducted so that the bit sequences (first and second) representing the X coordinates of the two points are compared with each other and the bit sequences (third and fourth) representing the Y coordinates of the two points are compared with each other.

FIG. 4 is a schematic visual illustration of how the original feature vectors of a texture block can be represented in the default mode. The default mode defines, in this embodiment, a bounding box in a coordinate frame that may be different from the X and Y coordinate frame using two points $p=(p_X, p_Y)$ and $q=(q_X, q_Y)$ and an aspect ratio defined as $$a = \frac{\text{height}}{\text{width}},$$

where the width of the bounding box is width=$\|p-q\|$ and the height of the bounding box, height, is defined based on the aspect ratio codeword 15 in FIG. 3A. For instance, the aspect ratio codeword 15 could be used to first calculate the aspect ratio, for instance, as $$a = \frac{1}{32} + A\frac{1}{16},$$

where A is an integer value obtained from the aspect ratio codeword 15. The parameter height can then be calculated from width and the aspect ratio using the formula height=a× width. The two axes of the coordinate frame are then $\bar{e}_1=q-p$ and $\bar{e}_2=(-\bar{e}_{1_Y}, \bar{e}_{1_X})$. The lower left point, i.e. the origin O, of this frame is $o=q-0.5a\bar{e}_2$. The available feature vectors for a texture block are then distributed uniformly in the box, where the aspect ratio is employed to select the number of divisions along the two axes, see FIGS. 5A to 5C. For example and as is seen in FIG. 5B and in particular in FIG. 5C, a very wide bounding box would benefit more from using more points along its widest axis at the cost of the number of point along its shortest axis.

In an embodiment, three different point distributions are available as illustrated in FIGS. 5A to 5C, i.e. 8×8 points in FIG. 5A, 4×16 points in FIG. 5B or 2×32 points in FIG. 5C. The point distribution to use for a texture block is defined by the aspect ratio and preferably by the aspect ratio codeword. Thus and with a 4-bit aspect ratio codeword, an aspect ratio codeword of 0000-0001$_{bin}$ uses a point distribution as in FIG. 5C, an aspect ratio codeword of 0010-0111$_{bin}$ uses a point distribution as in FIG. 5B and an aspect ratio codeword of 1000-1111$_{bin}$ represents a point distribution as in FIG. 5A.

The points $p=(p_X,p_Y)$ and $q=(q_X,q_Y)$ can always be oriented so that the aspect ratio is a number between zero and one. However, being able to encode an aspect ratio of one means that there are two ways of expressing the same bounding box, i.e. rotate the box 90 degrees. In order to avoid this redundancy, a maximum value of the aspect ratio which is somewhat smaller than 1.0 can be used. In an embodiment, the aspect ratio is therefore defined as $$a = \frac{1}{32} + A\frac{1}{16},$$

where A represents the aspect ratio codeword.

However, the above described default mode is still redundant. This is shown in FIG. 6. The figure plots how a bounding box will look for different combinations of $p_X,p_Y,q_X,q_Y$. For instance, if $p_X<p_Y$ and $q_X<q_Y$ the bounding box is present in the first quadrant of FIG. 6, i.e. according to any of the examples in FIGS. 5A to 5C.

The redundancy in the default mode is due to that bounding boxes in the third quadrant, i.e. corresponding to $p_X\geq p_Y$ and $q_X\geq q_Y$ are duplicates to the bounding boxes in the first quadrant. Thus, if a bounding box rotated at 225 degrees gives the best compression of a texture block, such a bounding box can instead be represented by a bounding box present in the first quadrant and rotated at 45 degrees. The same applies for bounding boxes in the fourth quadrant, i.e. rotated from 270 to 360 degrees, which are duplicates of the bounding boxes in the second quadrant, i.e. from 90 to 180 degrees.

From FIG. 6 it can be seen that the redundant area marked with broken lines excludes half of the combinations. If 7 bits are spent on each of $p_X,p_Y,q_X,q_Y$ as exemplified above, this means that there are in total $2^{7+7+7+7}=2^{28}$ bit combinations of the codeword portion and half of them, i.e. $2^{27}$, will be used in the default decoding mode and half of them are redundant and can therefore be used in the auxiliary decoding mode.

In an embodiment, the auxiliary decoding mode will be used in the bottom half of the unit circle as indicated in FIG. 6. This means that if $p_Y>q_Y$ the default decoding mode should be used. Correspondingly, if $p_Y=q_Y$ the bounding box lies on the X-axis and, in an embodiment, the default decoding mode is employed at 0 degrees (first quadrant) but not at 180 degrees (third quadrant). In such a case, one could assume that the auxiliary decoding mode should be used if $p_Y>q_Y$ or if $p_Y=q_Y$ and $p_X>q_X$. Otherwise the default decoding mode is used.

However, this would not result in exactly half of the combinations. There are in fact $2^7=128$ combinations when $p_Y=q_Y$ and $p_X=q_X$. Half of these could then be used in the default decoding mode and half of them in the auxiliary decoding mode.

FIG. 7 is a flow diagram illustrating an embodiment of the selecting step S2 of FIG. 1 for the above discussed embodiments. The method continues from step S1 in FIG. 1 and a next step S10 compares the first bit sequence corresponding to $p_X$ and the second bit sequence corresponding to $q_X$, the third bit sequence corresponding to $p_Y$ and the fourth bit sequence corresponding to $q_Y$ and the third bit sequence with a predefined value $2^k$, where $k=N_{p_Y}-1$. In more detail, if any of the conditions i) to iii) listed below are met the auxiliary decoding mode is selected for the encoded texture block and otherwise the default decoding mode is selected for the encoded texture block in step S10:

i) $p_Y>q_Y$
ii) $p_Y=q_Y$ AND $p_X>q_X$
iii) $p_Y=q_Y$ AND $p_X=q_X$ AND $p_Y<2^k$ In the third condition iii) the third bit sequence is, thus, within a predefined value interval of from 0 up to but not including $2^k$.

If any of the conditions i), ii) or iii) are met the method continues from step S10 to step S5 of FIG. 5 and otherwise, i.e. none of the conditions are met, the method instead continues to step S3 of FIG. 1.

FIG. 8 is a flow diagram illustrating an embodiment of the extracting step S3 in FIG. 1. The method continues from step S2 of FIG. 1 or from step 10 in FIG. 7. In the default decoding mode the codeword sequence is extracted by reading, in step S20, the $N_{p_X}+N_{q_X}+N_{p_Y}+N_{q_Y}$ bits from the bit positions of the encoded texture block occupied by the first bit sequence, the second bit sequence, the third bit sequence and the fourth bit sequence. The method then continues to step S4 of FIG. 1, where the read bits are employed to generate decoded texel value(s) for the texture block. Generally, the $N_{p_X}+N_{q_X}+N_{p_Y}+N_{q_Y}$ bits of the first bit sequence, the second bit sequence, the third bit sequence and the fourth bit sequence are already read from the encoded texture block in step S1 of FIG. 1. Hence, these bits are generally already available. In such a case, step S20 can be omitted or be modified as using the already read $N_{p_X}+N_{q_X}+N_{p_Y}+N_{q_Y}$ bits that are typically present on the cache.

Figure 9:
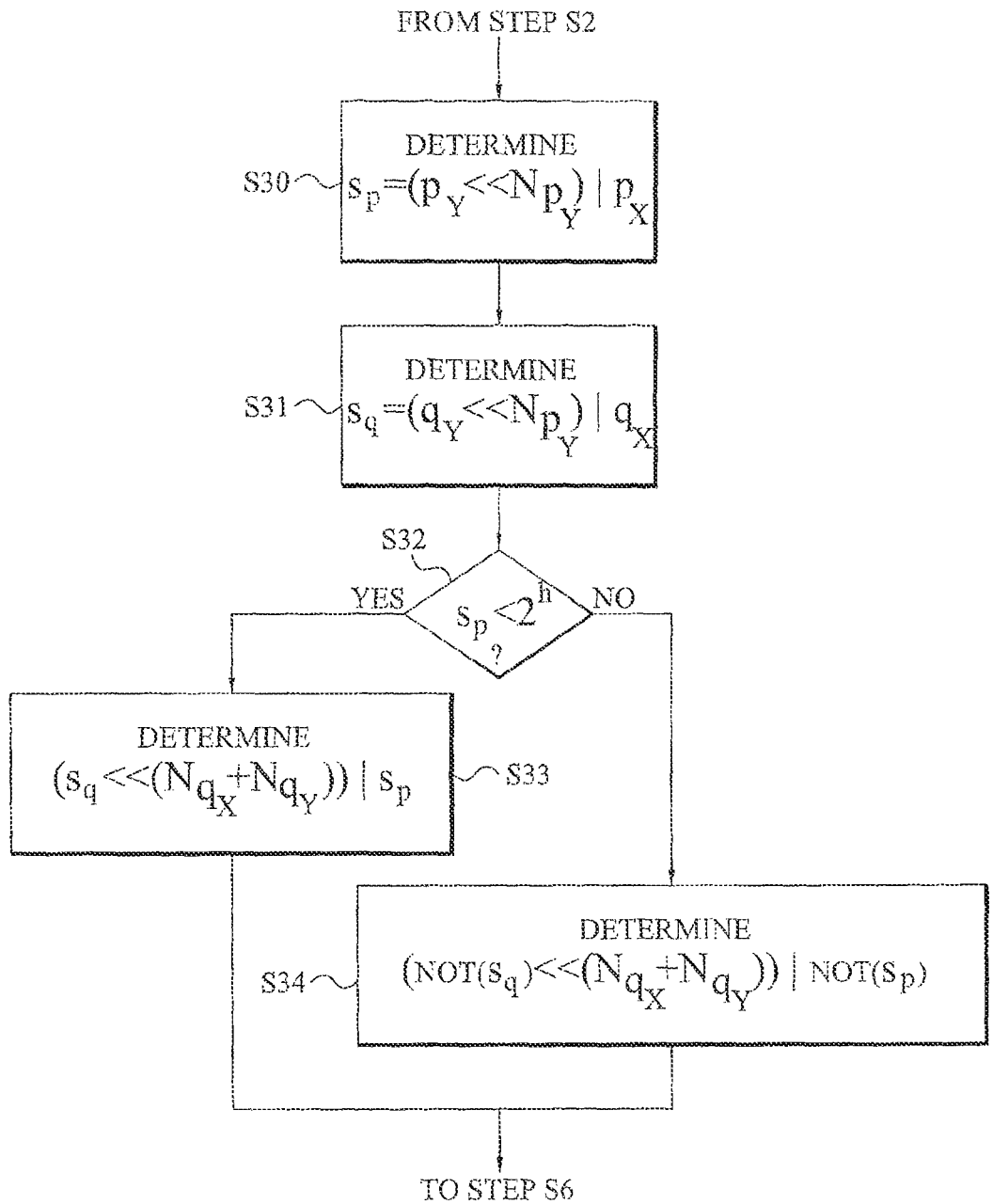
FIG. 9 is a flow diagram illustrating the extracting step S5 of FIG. 1 according to an embodiment.

In the auxiliary decoding mode only $N_{p_X}+N_{q_X}+N_{p_Y}+N_{q_Y}-1$ bits of the codeword sequence are available and can be used to represent the encoded texel values, i.e. feature vectors, of the texture block. In such a case, these $N_{p_X}+N_{q_X}+N_{p_Y}+N_{q_Y}-1$ bits need to be extracted from the codeword sequence. FIG. 9 is a flow diagram illustrating an embodiment of the extracting step S5 in FIG. 1. The method continues from step S2 of FIG. 1 or from step S10 of FIG. 7. A next step S30 determines a parameter $s_p=(p_Y<<N_{p_Y})|p_X$, wherein << denotes a left shift operation and | denotes a bitwise OR operation. A corresponding parameter $s_q=(q_Y<<N_{q_Y})|q_X$ is determined in step S31. The two steps S30 and S31 can be performed sequentially in any order or indeed at least partly in parallel. A next step S32 compares the parameter $s_p$ with a defined threshold $2^h$, wherein $h=N_{q_X}+N_{q_Y}-1$. If $s_p<2^h$ the method continues from step S32 to step S33. Step S33 determines the codeword sequence of $N_{p_X}+N_{q_X}+N_{p_Y}+N_{q_Y}-1$ bits as $(s_q<<(N_{q_X}+N_{q_Y}))|s_p$. If instead $s_p\geq 2^h$ the method continues from step S32 to step S34. Step S34 determines the codeword sequence of $N_{p_X}+N_{q_X}+N_{p_Y}+N_{q_Y}-1$ bits as $(NOT(s_q)<<(N_{q_X}+N_{q_Y}))|NOT(s_p)$, wherein NOT( ) denotes a bitwise inverting operation.

Table 1 below visually illustrates how the $N_{p_X}+N_{q_X}+N_{p_Y}+N_{q_Y}-1$ bits are available for the auxiliary decoding mode.

TABLE 1 plot of various values of the parameters $s_p$ and $s_q$

| $s_q$ | | $p_Y = 0$<br>$p_X =$ | | | | $p_Y = 1$<br>$p_X =$ | | | | $p_Y = 3$<br>$p_X =$ | | | | $p_Y = 3$<br>$p_X =$ | | | |
|---|---|---|---|---|---|---|---|---|---|---|---|---|---|---|---|---|---|
| $s_p$ | | 0 | 1 | 2 | 3 | 0 | 1 | 2 | 3 | 0 | 1 | 2 | 3 | 0 | 1 | 2 | 3 |
| $q_Y=0\ q_X=$ | 0 | + | * | * | * | X | X | X | X | X | X | X | X | X | X | X | X |
|  | 1 | . | + | * | * | X | X | X | X | X | X | X | X | X | X | X | X |
|  | 2 | . | . | + | * | X | X | X | X | X | X | X | X | X | X | X | X |
|  | 3 | . | . | . | + | X | X | X | X | X | X | X | X | X | X | X | X |
| $q_Y=1\ q_X=$ | 0 | . | . | . | . | + | * | * | * | X | X | X | X | X | X | X | X |
|  | 1 | . | . | . | . | . | + | * | * | X | X | X | X | X | X | X | X |
|  | 2 | . | . | . | . | . | . | + | * | X | X | X | X | X | X | X | X |
|  | 3 | . | . | . | . | . | . | . | + | X | X | X | X | X | X | X | X |
| $q_Y=2\ q_X=$ | 0 | | | | | | | | | * | * | * | X | X | X | X | X |
|  | 1 | | | | | | | | | | * | * | * | X | X | X | X |
|  | 2 | | | | | | | | | | | * | * | X | X | X | X |
|  | 3 | | | | | | | | | | | | X | X | X | X | X |
| $q_Y=3\ q_X=$ | 0 | | | | | | | | | | | | | * | * | * | * |
|  | 1 | | | | | | | | | | | | | | * | * | * |
|  | 2 | | | | | | | | | | | | | | | * | * |
|  | 3 | | | | | | | | | | | | | | | | * |

In Table 1 2-bit variables have been used for the bit sequences $p_X, p_Y, q_X, q_Y$ in order to provide a table of reasonable size. In Table 1, the combinations where $p_Y > q_Y$ are marked with x, the combinations where $p_Y = q_Y$ and $p_X > q_X$ are marked with * and the combinations where $p_Y = q_Y$ and $p_X = q_X$ and $p_Y < 2^1 = 2$ are marked with +. It can be seen from Table 1 that the lower-right triangle of combinations fits exactly into the area marked with dots in the upper left corner of Table 1. The marked combinations (x, *, +) corresponding to the auxiliary decoding mode amounts to half of the possible bit combinations of the bit sequences $p_X, p_Y, q_X, q_Y$.

In an embodiment, the auxiliary decoding mode interprets the encoded texture block as illustrated in FIG. 3B. In such a case, the X-coordinate and the Y-coordinate of the encoded texture block could represent a corner, such as lower-left corner, of a square using, for instance 2×11 bits or 12+11 bits. The length of the square is then defined by the length codeword, which in an example could of 9 bits or 8 bits. Inside the square, 8×8 points are uniformly distributed implying that each texel has a 3-bit X-index and a 3-bit Y-index in order to identify one of the points that represent a feature vector for a texel. In an embodiment that is targeting texture blocks with slowly varying normals that are typically rather poorly handled by the previously described default decoding mode, the side length of the square could be limited for added precision. For instance, a maximum length of ¼ could be used, which implies that the minimum side of the square is $$\frac{1}{4 \times 2^9} = \frac{1}{2048} \text{ or } \frac{1}{4 \times 2^8} = \frac{1}{1024}.$$

Other maximum lengths are possible and within the scope of the embodiments, such as ½.

The embodiments therefore provide at least one auxiliary mode that can be used to encode and decode texture blocks in addition to the default mode. This auxiliary mode additionally comes without sacrificing any bits of the encoded texture block in order to signal which processing mode that should be employed. Hence, the embodiments introduce the auxiliary decoding mode without the need for any dedicated mode bit or sequence and thereby the auxiliary decoding mode comes at no cost for the default decoding mode.

Decoding Example

In a decoding example a bit layout as illustrated in FIGS. 3A and 3B are assumed. Furthermore assume a bit sequence of:
1000101 1010110 0000011 0000101 0011 001000 . . . 000
In such a case $p_x = 1000101_{bin} = 69$, $q_X = 1010110_{bin} = 86$, $p_Y = 0000011_{bin} = 3$, $q_Y = 0000101_{bin} = 5$ and $A = 0011_{bin} = 3$. None of the conditions i) to iii) are met since $p_Y < q_Y$ and $p_X < q_X$. The present encoded texture block should therefore be decoded according to the default decoding mode. An aspect ratio codeword of 3 implies that a point distribution as illustrated in FIG. 5B should be used with 4×16 points in the rotated bounding box.

In the example $\bar{e}_1 = q - p = (86,5) - (69,3) = (17,2)$ and $\bar{e}_2 = (-\bar{e}_{1y}, \bar{e}_{1x}) = (-2, 17)$. The aspect ratio is calculated as $$a = \frac{1}{32} + A\frac{1}{16} = \frac{1}{32} + 3\frac{1}{16} = \frac{7}{32}.$$

The lower left point of the bounding box is $$o = q - 0.5a\bar{e}_2 = (22, 5) - 0.5 \times \frac{7}{32} \times (-2, 17) = \frac{1}{64}(1422, 201).$$

The bounding box is spanned by the two vectors $\bar{e}_1$ and $$\bar{v} = a\bar{e}_2 = \frac{1}{32}(-14, 119).$$

The feature vector for a texel is then calculated from $o, \bar{e}_1, \bar{v}$ and the X-index and the Y-index associated with the present texel. In this particular example with a point distribution as illustrated in FIG. 5B, the X-index consists of 4 bits to select between one of the possible 16 points along the X-axis or more correctly along the $\bar{e}_1$ axis and the Y-index consists of 2 bits to select between one of the 4 possible points along the Y-axis or more correctly along the $\bar{e}_2$ axis.

For instance, assume the 4-bit index for X is $0110_{bin}$ and the 2-bit index for Y is $10_{bin}$. This means that we should start from o and go $0110_{bin}=6$ steps of size $\frac{1}{15}^{th}$ in the direction along $\overline{e}_1$ and $10_{bin}=2$ steps of size $\frac{1}{3}^{rd}$ along $\overline{v}$. Thus, for this particular texel we would end up in $$o + \frac{6}{15}\overline{e}_1 + \frac{2}{3}\overline{v} = \frac{1}{64}(4430, 73) + \frac{6}{15}(17, 2) + \frac{2}{3}\frac{1}{32}(-14, 119)$$

which, if we put it on common denominator gives $$\frac{15}{960}(4430, 73) + \frac{384}{960}(17, 2) + \frac{20}{960}(-14, 119) = \frac{1}{960}(72698, 4243),$$

which is approximately equal to (75.73, 4.42). In an embodiment, a transformation from this representation, where 0 is the smallest number and 127 is the largest number, to a representation within [−1.0, 1.0] is performed. Hence we subtract 63.5 and divide by 63.5. This means that $$(X, Y) = [(75.73, 4.42) - (63.5, 63.5)]\frac{1}{63.5} = (0.193, -0.930).$$

We can now calculate Z for the texel in question as $Z=\sqrt{1-X^2-Y^2}=\sqrt{1-0.193^2-0.930^2}=0.311906$. Hence the resulting normal for this texel equals (X, Y, Z)=(0.193, −0.930, 0.312).

In another example the encoded texture block has the following bit sequence: 0000101 0010110 0000101 0000011 0011 001000 . . . 000

In such a case $p_X=1000101_{bin}=69$, $q_X=0010110_{bin}=22$, $p_Y=0000101_{bin}=5$, $q_Y=0000011_{bin}=3$ and $p_Y>q_Y$. The encoded texture block should therefore be decoded according to the auxiliary decoding mode.

The parameter $s_p=(p_Y<<N_{p_Y})|p_X=0000101000000|0000-101=00001010000101$ and the parameter $s_q=(q_Y<<N_{q_Y})|q_X=000001100000000|0010110=00000110010110$. In this case, the parameter $h=N_{q_X}+N_{q_Y}-1=7+7-1=13$ and the parameter $s_q=00000110010110=406$ is compared to the threshold $2^h=2^{13}=8192$. In this case, $s_q<2^h$ and the $N_{p_X}+N_{q_X}+N_{p_Y}+N_{q_Y}-1=27$ bits of the codeword sequence are determined to be $(s_q<<(N_{q_X}+N_{q_Y}))|s_p=000001100101100000000000000|-00001010000101=00000110010110000101$ The top value will always be zero, which means that our 27-bit value will be $000011001011000001010000101_{bin}$. These bits, together with the remaining 100 bits, will now be interpreted using the auxiliary decoding mode. The auxiliary decoding mode uses, in this example, the first 2×11 bits to encode the lower-left corner of a square and 9 bits for encoding the length of the side of the square. Inside the square we use 3+3 bits per texel to select the position in the square for the texel in question. Thus in total we have 2×11+9+16×6=127 bits in total. In the above example, the first 11 bits would be the X-coordinate of the square: $00001100101_{bin}=101$. The next 11 bits are the Y-coordinate: $10000010100_{bin}=1044$. In an embodiment, these coordinates are transformed from values within the range of [0, 2047] to values within the range of [−1.0, 1.0] in similarity to the case presented in the previous decoding example. Thus, the lower left corner of the square becomes $$(X, Y) = [(101, 1044) - (1023.5, 1023.5)]\frac{1}{1023.5} = (-0.901, 0.020).$$

Next, we have nine bits that describe the side length of the square. We use the remaining five bits from the 27-bit codeword $00101_{bin}$ and concatenate that to the four next four bits $0011_{bin}$ to get $001010011_{bin}=83$. In an embodiment, since a side length of zero is not interesting one is added to this to get 83+1=84=s. This number is converted to the actual side length by multiplying with a constant b. This constant is set, in an example, so that the maximum side length of the square is ½. The maximum s equals 512, which means that 512×b=½, or that b=1/1024. In our case with s=84 we get a side length w=84×(1/1024)=0.0820. To finally decode the texel we need the two 3-bit pixel indices. Assume they are $011_{bin}$ and $010_{bin}$. This means that we should move $011_{bin}=3$ steps of size ⅐ in the X-direction from the lower left corner, and $010_{bin}=2$ steps of size ⅐ in the Y-direction. The X- and Y-values for the texel thus becomes $$(-0.901, 0.020) + \left(\frac{3}{7} \times \frac{84}{1024}, \frac{2}{7} \times \frac{84}{1024}\right) = (-0.866, 0.043).$$

Next we want to decode the Z-value, which is done by $Z=\sqrt{1-X^2-Y^2}=\sqrt{1-(-0.866)^2-0.043^2}=0.498$. Hence the entire triplet (X,Y,Z) is equal to (−0.966, 0.043, 0.498).

Encoding

Figure 10:
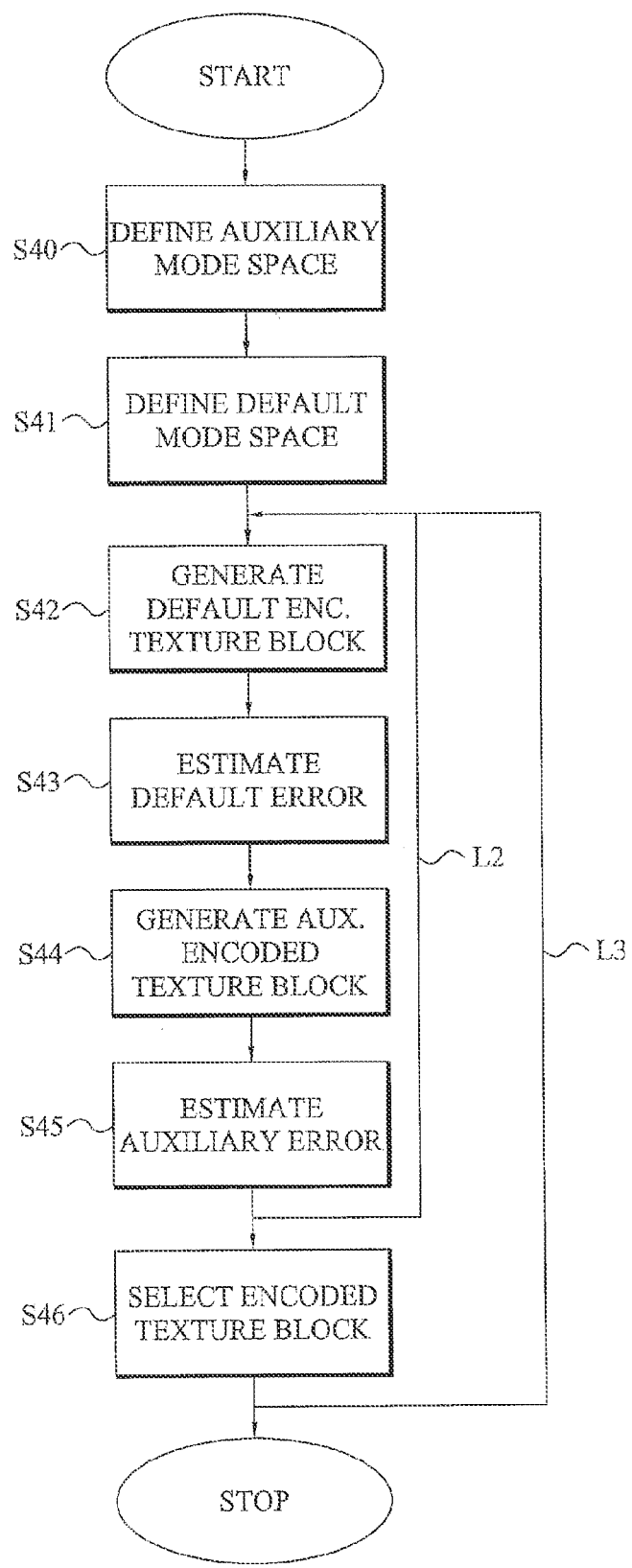
FIG. 10 is a flow diagram illustrating a multi-mode encoding method according to an embodiment.

FIG. 10 illustrates a (lossy) multi-mode method of encoding a texture block comprising multiple texels according to an embodiment. Each texel of the texture block has a respective texel value, preferably in the form of a feature vector.

In an optional embodiment, a texture is first decomposed or divided into a number of texture blocks. In a particular embodiment, a texture block comprises sixteen texels and has a size of $2^m \times 2^n$ texels, where m=4-n and n=0, 1, 2, 3, 4. More preferably, m and n are both 2. The whole texture is preferably decomposed into (non-overlapping) texture blocks. However, in some applications, only a portion of a texture is encoded and, thus, only this portion is decomposed into texture blocks.

The following steps S40 and S46 perform an encoding or compression of the texture blocks. Firstly, in step S40 an auxiliary mode space encompassing bit sequence combinations of a first bit sequence, a second bit sequence, a third bit sequence and a fourth bit sequence is defined. In this so-called auxiliary mode space an integer value represented by the third bit sequence is larger than an integer value represented by the fourth bit sequence, or the integer value represented by the third bit sequence is equal to the integer value represented by the fourth bit sequence and an integer value represented by the first bit sequence is larger than an integer value represented by the second bit sequence, or the integer value represented by the third bit sequence is equal to the integer value represented by the fourth bit sequence, the integer value represented by the first bit sequence is equal to the integer value represented by the second bit sequence and the integer value represented by the third bit sequence is within a predefined value interval, i.e. smaller than the predefined value and preferably smaller than $2^k$. The above mentioned integer value are obtained by interpreting the first to fourth bit sequences, i.e. $P_X, q_X, p_Y, q_Y$, as integer values.

A corresponding default mode space encompassing bit sequence combinations of the first to fourth bit sequences is defined in step S41. This default mode space is complementary to the auxiliary mode space defined in step S40. This means that the default mode space encompasses bit sequence combinations of the first bit sequence, the second bit sequence, the third bit sequence and the fourth bit sequence that are not encompassed by the auxiliary mode space. The union of the auxiliary mode space and the default mode space thereby encompasses all combination of the first to fourth bit sequences.

The default mode space defined in step S41 and the auxiliary mode space defined in step S40 are complementary implying that a given bit sequence combination either belongs to the default mode space or belongs to the auxiliary mode space, depending on the particular values of the first to fourth bit sequences.

The two steps S40 and S41 can be performed sequentially or at least partly in parallel. In addition, steps S40 and S41 are typically only performed once for a texture or indeed for a set of textures to be encoded. Thus, once a default mode space and an auxiliary mode space have been defined these mode space definitions are employed for the following encoding of various texture blocks.

A next step S42 generates a default encoded texture block by representing the texture block with a combination of the first to fourth bit sequences selected from the default mode space defined in step S41. Thus, the default encoded texture block has a particular combination of the first to fourth bit sequences selected from the default mode space.

In a next step S43, a default error indicative of representing the texture block with the default encoded texture block generated in step S42 is estimated. This step S43 basically involves decoding the default encoded texture block according to a corresponding default decoding mode to generate a decoded texture block. The texel values of this decoded texture block are then compared to the original texel values of the unprocessed texture block to get the error estimate $\varepsilon^2$:

$$\varepsilon^2 = \sum_{i=0}^{3}\sum_{j=0}^{3}\left((x_{ij} + x_{ij}^O)^2 + (y_{ij} - y_{ij}^O)^2\right)$$

where $(x_{ij}, y_{ij})$ is the texel value for texel (i, j) in the texture block as obtained from the default decoding and $(x_{ij}^O, y_{ij}^O)$ is the original texel value for that texel. In an alternative approach, the error estimate is calculated as:

$$\varepsilon^2 = \sum_{i=0}^{3}\sum_{j=0}^{3}\left((x_{ij} - x_{ij}^O)^2 + (y_{ij} - y_{ij}^O)^2 + (z_{ij} - z_{ij}^O)^2\right)$$

where $(x_{ij}, y_{ij}, z_{ij})$ is the texel value for texel (i, j) in the texture block as obtained from the default decoding and $(x_{ij}^O, y_{ij}^O, z_{ij}^O)$ is the original texel value for that texel. Thus, in this alternative approach also the Z-component is included in the error estimation. As discussed in the foregoing, $z_{ij}$ is preferably calculated from $x_{ij}, y_{ij}$, such as $z_{ij} = \sqrt{1 - x_{ij}^2 - y_{ij}^2}$.

A next step S44 encodes the texture block according to an auxiliary encoding mode to generate an auxiliary encoded texture block. This auxiliary encoded texture block comprises at least the first to fourth bit sequences selected from the auxiliary mode space defined in step S40. Thus, the auxiliary encoded texture block has a particular combination of the first to fourth bit sequences selected from the auxiliary mode space.

An auxiliary error is estimated for the auxiliary encoded texture block in step S45. This error is indicative of representing the original texel values of the texture block with the texel values obtainable from the auxiliary encoded texture block. The error is estimated in a similar manner to what was described in connection with step S43 with the exception of using the auxiliary encoded texture block instead of the default encoded texture block and using the auxiliary decoding mode instead of the default decoding mode.

The steps S42 to S45 are preferably performed more than once, which is schematically illustrated by the line L2. Thus, in such a case, more than one respective default encoded texture block and/or more than one respective auxiliary encoded texture block are generated. In a particular embodiment, an exhaustive search could be used implying that each combination of the first to fourth bit sequences according to the default mode space and each combination of the first to fourth bit sequences according to the auxiliary mode space is generated and a respective default or auxiliary error is calculated.

Steps S42 and S43 and steps S44 and S45 can be performed sequentially in any order or at least partly in parallel. In particular if multiple different default and auxiliary encoded texture blocks are generated and tested it could be preferred to perform steps S42+S43 and steps S44+S45 in parallel in order to reduce the total encoding time.

In the next step S46, an encoded texture block to use for the current texture block is selected from the default encoded texture block(s) and the auxiliary encoded texture block(s). This selection is performed based on the errors estimated in steps S43 and S45. Thus, the encoded texture block that resulted in the smallest error and which therefore is best suited to represent the original block in terms of peak-signal-to-noise-ratio (PSNR) or some other commonly employed quality measure is selected in this step S46.

The steps S42 to S46 are preferably repeated for all texture blocks provided during the decomposing of the texture, schematically illustrated by line L3. Note that due to the dynamic selection of encoding mode, all of the resulting encoded texture blocks can have been generated according to the default or the auxiliary encoding mode. However, for most practical textures, some of the encoded texture blocks will be generated according the default encoding mode while the remaining encoded texture blocks are generated according to the auxiliary encoding mode. The result is then a sequence or file of encoded texture blocks. The resulting encoded texture blocks could be ordered in a file from left to right and top to bottom in the same order in which they were broken down. The method then ends.

The encoded texture can then be provided to a memory for storage therein until a subsequent rendering, e.g. display, of the texture. Furthermore, the encoded texture can be provided as a signal of encoded texture blocks to a transmitter for (wireless or wired) transmission to another unit.

Figure 11:
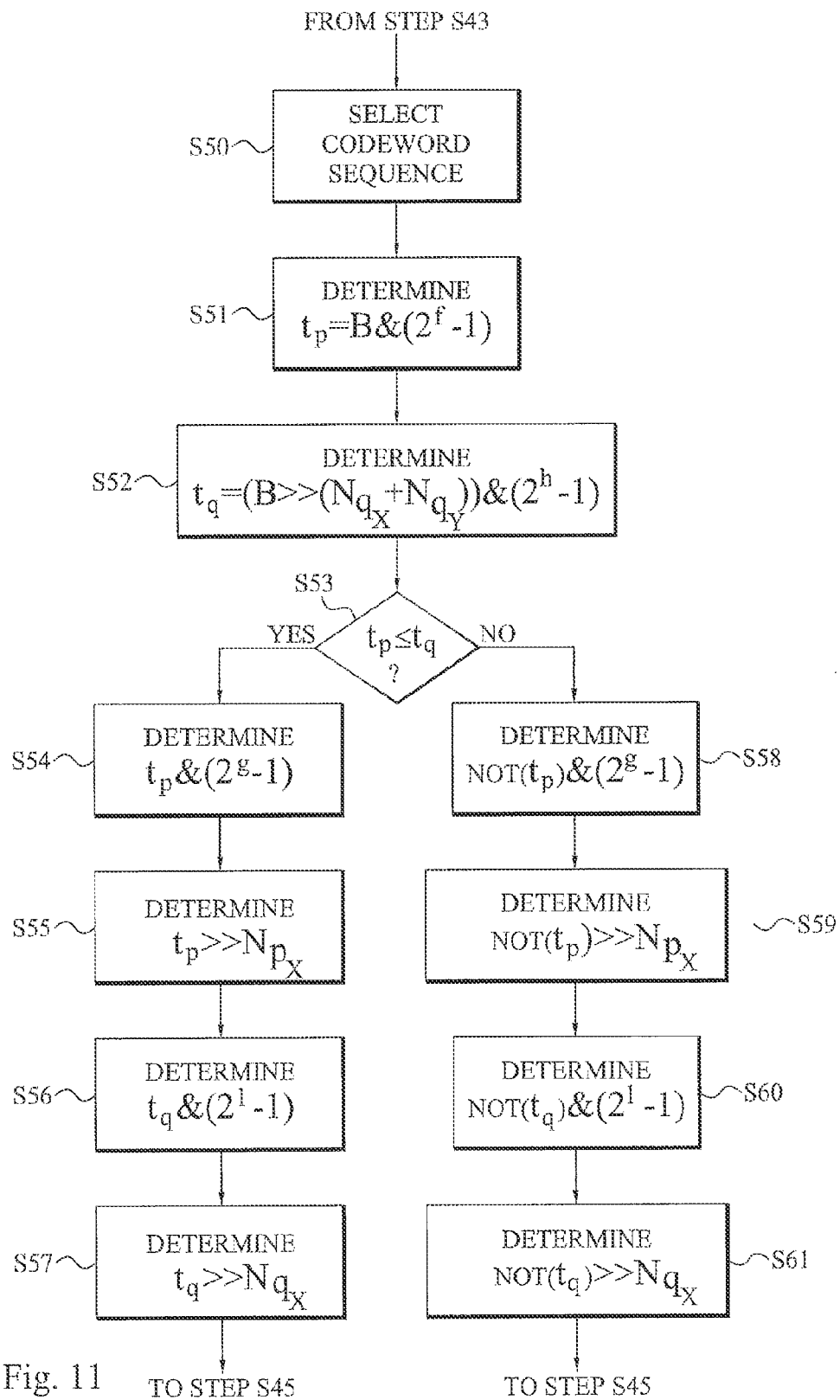
FIG. 11 is a flow diagram illustrating the generating step S44 of FIG. 10 according to an embodiment.

FIG. 11 is a flow diagram illustrating a particular embodiment of generating the auxiliary encoded texture block in FIG. 10. The method continues from step S43 in FIG. 10. A next step S50 selects a codeword sequence B of $N_{p_X}+N_{q_X}+N_{p_Y}+N_{q_Y}-1$ bits. A next step S51 determines a first parameter $t_p=B\&(2^f-1)$, wherein $f=N_{p_X}+N_{p_Y}$ and & denotes a bitwise AND operation. A second parameter is determined in step S52 as $t_q=(B>>(N_{q_X}+N_{q_Y}))\&(2^h-1)$, wherein $h=N_{q_X}+N_{q_Y}-1$ and >> denotes a right shift operation. A next step S53 compares the first parameter with the second parameter. If $t_p \leq t_q$ the method continues from step S53 to step S54. This step S54 determines the first bit sequence to be $t_p\&(2^g-1)$, wherein $g=N_{p_X}$. The second bit sequence is determined in step S55 to be $t_p >> N_{p_X}$. Steps S56 and S57 determine the third bit sequence and the fourth bit sequence to be and $t_q \& (2^l-1)$, wherein $l=N_{q_X}$ and $t_q >> N_{q_X}$ respectively. Steps S54 to S57 can be performed sequentially in any order or at least partly in parallel.

If $t_p > t_q$ in step S53 to the method instead continues to step S58. Step S58 determines the first bit sequence to be NOT($t_p$) $\& (2^g-1)$, wherein NOT( ) denotes a bitwise inverting operation. The second bit sequence is determined in step S59 as NOT($t_p$)$>>N_{p_X}$. The third bit sequence is determined as NOT($t_q$)$\&(2^l-1)$ in step S60 and the fourth bit sequence is determined in step S61 to be NOT($t_q$)$>>N_{q_X}$. Steps S58 to S61 can be performed sequentially in any order or at least partly in parallel.

The operation of the method as illustrated by line S50 to S57 or S61 thus transforms a codeword sequence of $N_{p_X}+N_{q_X}+N_{p_Y}+N_{q_Y}-1$ bits into a combination of the first to fourth bit sequences of $N_{p_X}+N_{q_X}+N_{p_Y}+N_{q_Y}$ bits in total and being present in the auxiliary mode space. The method then continues to step S45 of FIG. 10.

Figure 12:
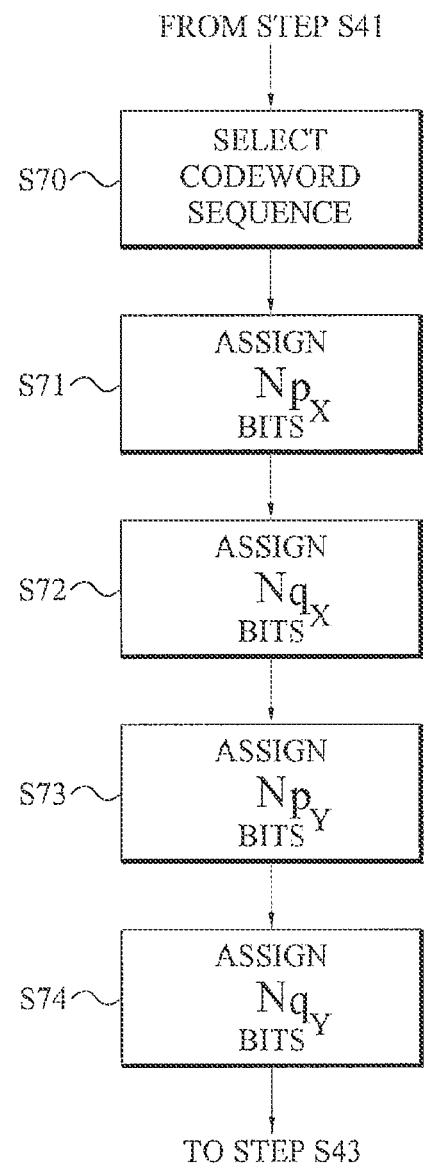
FIG. 12 is a flow diagram illustrating the generating step S42 of FIG. 10 according to an embodiment.

FIG. 12 is a flow diagram of a corresponding embodiment of the step of generating a default encoding texture block in FIG. 10. The method continues from step S41 in FIG. 10. A next step S70 selects a codeword sequence of $N_{p_X}+N_{q_X}+N_{p_Y}+N_{q_Y}$ bits from the default mode space. Thus, in the default encoding mode all $N_{p_X}+N_{q_X}+N_{p_Y}+N_{q_Y}$ bits are available as payload bits and can be used to represent the codeword sequence. This should be compared to the corresponding step S50 of FIG. 11 for the auxiliary encoding mode where only $N_{p_X}+N_{q_X}+N_{p_Y}+N_{q_Y}-1$ bits are available for the codeword sequence. The following steps S71 to S74 assign bits of the codeword sequence to the first to fourth bit sequences. These steps S71 to S74 can be performed sequentially in any order or at least partly in parallel. Step S71 assigns $N_{p_X}$ bits of the codeword sequence selected in step S70 as the first bit sequence. $N_{q_X}$ bits of the codeword sequence are selected as the second bit sequence in step S72. Step S73 assigns $N_{p_Y}$ bits of the codeword sequence as the third bit sequence and step S74 assigns $N_{q_Y}$ bits of the codeword sequence as the fourth bit sequence. The method then continues to step S43 of FIG. 10.

In a particular embodiment, $N_{p_X}+N_{p_Y}=N_{q_X}+N_{q_Y}$ and preferably $N_{p_X}=N_{p_Y}=N_{q_X}=N_{p_Y}$.

Implementation Aspects

The texture encoding and decoding scheme according to the present embodiments could be provided in a general data processing system, e.g. in a user terminal or other unit configured for processing and/or rendering textures. Such a terminal could be a computer, e.g. PC, or laptop, a tablet computer, a game console or a thin client, such as a Personal Digital Assistance (PDA), mobile unit or telephone.

Decoder

Figure 13:
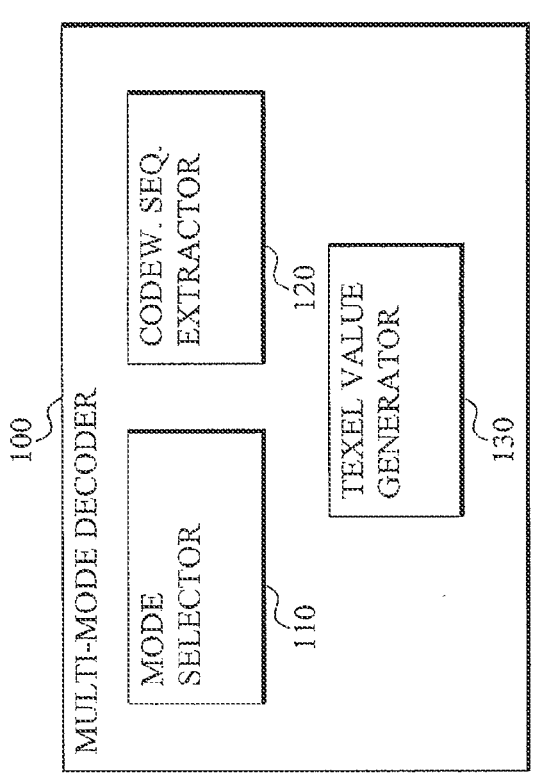
FIG. 13 is a schematic block diagram of a multi-mode decoder according to an embodiment.

FIG. 13 is a schematic block diagram of an embodiment of a multi-mode decoder 100 according to an embodiment. The multi-mode decoder 100 comprises a mode selector 110 configured to select between a default decoding mode and an auxiliary decoding mode for an encoded texture block to be decoded by the multi-mode decoder 100. The mode selector 110 selects between the decoding modes by comparing a first bit sequence of the encoded texture block with a second bit sequence of the encoded texture block, comparing a third and a fourth bit sequence of the encoded texture block and by comparing the third bit sequence with a predefined value. The mode selector 110 then generates a mode selection signal, which could be in the form of a single bit, indicating which decoding mode that should be used for the present encoded texture block based on the bit sequence comparisons. A codeword sequence extractor 120 is implemented in the multi-mode decoder 100 and is responsive to the mode selection signal. The codeword sequence extractor 120 extracts a codeword sequence of $N_{p_X}+N_{q_X}+N_{p_Y}+N_{q_Y}$ bits from the encoded texture block if the mode selection signal indicates the default decoding mode. Correspondingly, if the mode selection signal instead indicates that the present encoded texture block should be decoded according to the auxiliary decoding mode the codeword sequence extractor 120 instead extracts a codeword sequence of $N_{p_X}+N_{q_X}+N_{p_Y}+N_{q_Y}-1$ bits from the encoded texture block.

A texel value generator 130 is provided in the multi-mode decoder 100 for generating a decoded texel value for at least one texel in the texture block based on the $N_{p_X}+N_{q_X}+N_{p_Y}+N_{q_Y}$ bits or the $N_{p_X}+N_{q_X}+N_{p_Y}+N_{q_Y}-1$ bits of the codeword sequence from the codeword sequence extractor 120. The texel value generator 130 is preferably also responsive to the mode selection signal and generates the at least one decoded texel value using a default decoding mode and the $N_{p_X}+N_{q_X}+N_{p_Y}+N_{q_Y}$ bits if the mode selection signal indicates the default decoding mode and otherwise generates the at least one decoded texel value using an auxiliary decoding mode and the $N_{p_X}+N_{q_X}+N_{p_Y}+N_{q_Y}-1$ bits.

In an embodiment, the mode selector 110 is configured to select the auxiliary decoding mode for the present encoded texture block if any of the conditions i) to iii) are met:
i) $p_Y > q_Y$
ii) $p_Y = q_Y$ AND $p_X > q_X$
iii) $p_Y = q_Y$ AND $p_X = q_X$ AND $p_Y < 2^k$ If none of the conditions are met the mode selector 110 instead selects the default decoding mode for the encoded texture block. These criteria are very simple to evaluate in hardware. A subtraction can be used to test if $p_Y > q_Y$ or $p_Y = q_Y$. Another subtraction can be used to test if $p_X > q_X$ or $p_X = q_X$. The comparison between $p_Y$ and the predefined value $2^k$ can be implemented as a simple test of the most significant bit of $p_Y$. Hence, the mode selector 110 can effectively be implemented in hardware.

Figure 14:
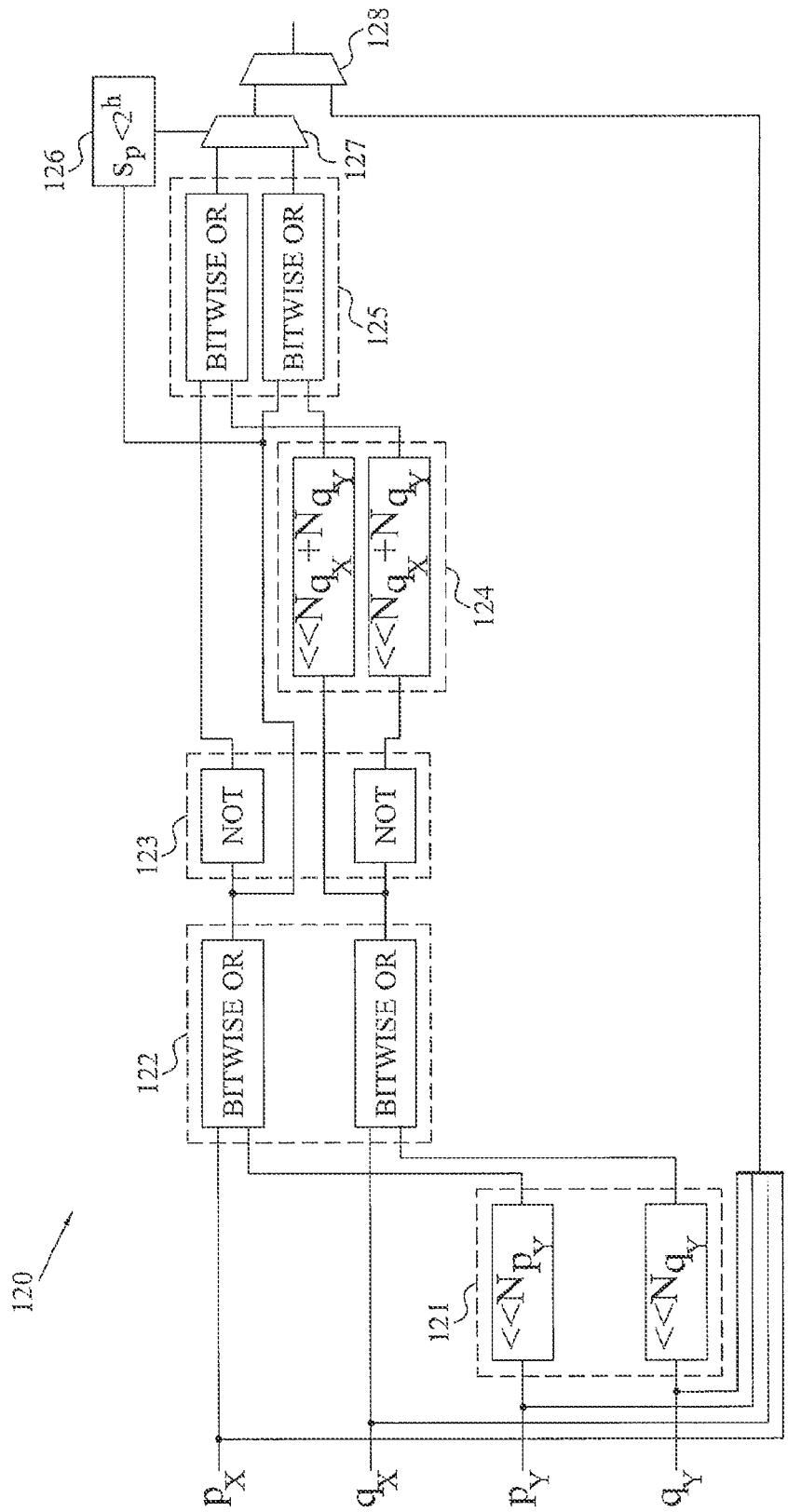
FIG. 14 is a schematic block diagram of the codeword sequence extractor of FIG. 13 according to an embodiment.

FIG. 14 is schematic hardware implementation of the codeword sequence extractor 120 of the multi-mode decoder in FIG. 13. The codeword sequence extractor 120 is preferably configured to read the $N_{p_X}+N_{q_X}+N_{p_Y}+N_{q_Y}$ bits from the bit positions of the encoded texture block occupied by the first to fourth bit sequences if the mode selector has selected the default decoding mode. Thus, the codeword sequence extractor 120 preferably comprises a first multiplexor 128 that selects between the $N_{p_X}+N_{q_X}+N_{p_Y}+N_{q_Y}$ bits that correspond to the first to fourth bit sequences and the $N_{p_X}+N_{q_X}+N_{p_Y}+N_{q_Y}-1$ bits determined from the first to fourth bit sequences in the auxiliary decoding mode. Thus, if the mode selection signal indicates the default decoding mode the $N_{p_X}+N_{q_X}+N_{p_Y}+N_{q_Y}$ bits are output and otherwise the $N_{p_X}+N_{q_X}+N_{p_Y}+N_{q_Y}-1$ bits are output from the first multiplexor 128.

The codeword sequence extractor 120 also comprises a first left shift operator 121 configured to determine ($p_Y << N_{p_Y}$) and ($q_Y << N_{q_Y}$). A first bitwise OR operator 122 is connected to the first left shift operator and is configured to determine $s_p = (p_Y << N_{p_Y}) | p_X$ and $s_q = (q_Y << N_{q_Y}) | q_X$. The codeword sequence extractor 120 also comprises a bitwise inverting operator 123 connected to the first bitwise OR operator 122 and configured to determine NOT($s_q$) and NOT($s_p$). A second left shift operator 124 is connected to the first bitwise OR operator 122 and the bitwise inverting operator 123. This second left shift operator 124 is configured to determine ($s_q << (N_{q_X}+N_{q_Y})$) and (NOT($s_q$)$<<(N_{q_X}+N_{q_Y})$). A second bitwise OR operator 125 connected to the first bitwise OR operator 122 and the second left shift operator 124 is configured to determine $(s_q<<(N_{q_X}+N_{q_Y}))|s_p$ and $(NOT(s_q)<<(N_{q_X}+N_{q_Y}))|NOT(s_p)$. The outputs from the second bitwise OR operator 125 are input to a selector 127 represented by a multiplexor 127 in FIG. 14. The multiplexor 127 selects between outputting $(s_q<<(N_{q_X}+N_{q_Y}))|s_p$ and $(NOT(s_q)<<(N_{q_X}+N_{q_Y}))|NOT(s_p)$ as the codeword sequence of $N_{p_X}+N_{q_X}+N_{p_Y}+N_{q_Y}-1$ bits. The selection is performed based on a comparison between the parameter $s_p$ from the bitwise OR operator 122 and the threshold $2^h$. The comparison between the parameter $s_p$ and the threshold $2^h$ is performed by a comparator 126 connected to the multiplexor 127. If $s_p<2^h$ as determined by the comparator 126, the multiplexor 127 outputs $(s_q<<(N_{q_X}+N_{q_Y}))|s_p$ as the codeword sequence and otherwise outputs $(NOT(s_q)<<(N_{q_X}+N_{q_Y}))|NOT(s_p)$. The output from the multiplexor 127 is connected to one of the inputs of the first multiplexor 128.

The units 110, 120 and 130 of the multi-mode decoder 100 may be provided as software, hardware or a combination thereof. The units 110, 120 and 130 may be implemented together in the multi-mode decoder 100. Alternatively, a distributed implementation is also possible with some of the units provided elsewhere in a user terminal.

Encoder

Figure 15:
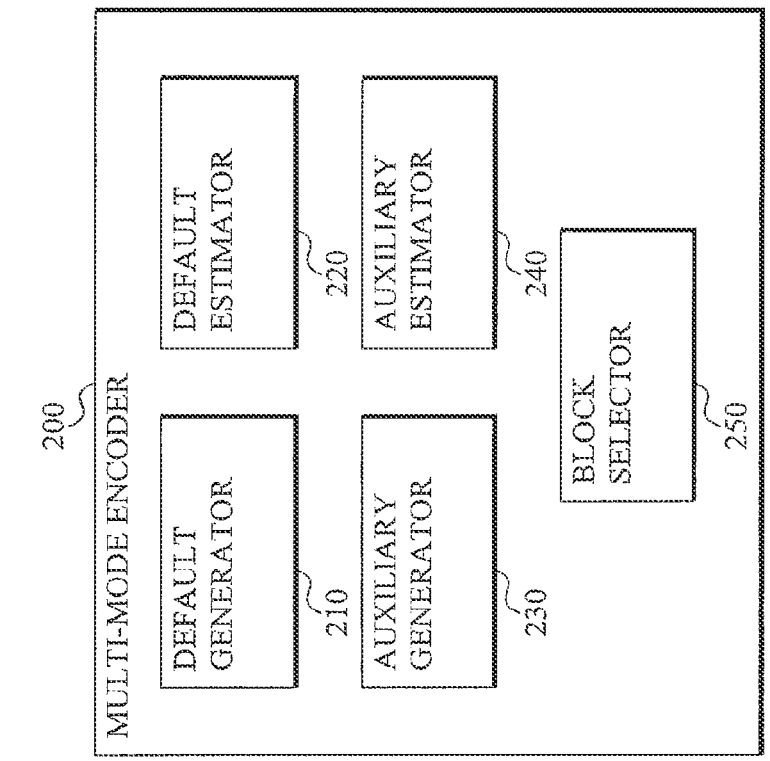
FIG. 15 is a schematic block diagram of a multi-mode encoder according to an embodiment.

FIG. 15 is a schematic block diagram of an embodiment of a multi-mode encoder 200 design to encode a texture block comprising multiple texels each having a respective texel value. The multi-mode encoder 200 comprises a default generator 210 configured to generate at least one encoded texture block by representing the texture block with a respective combination of a first bits sequence, a second bit sequence, a third bit sequence and a fourth bit sequence from a default mode space. This default mode space encompasses particular bit combinations of the first to fourth bit sequences as previously disclosed herein. A default estimator 220 is configured to estimate a respective default error for each default encoded texture block generated by the default generator 210. The default error is indicative of representing the texture block with the default encoded texture block.

An auxiliary generator 230 is also provided in the multi-mode encoder 200. The auxiliary generator 230 is configured to generate at least one auxiliary encoded texture block by representing the texture block with a respective combination of the first to fourth bit sequences selected from the previously mentioned auxiliary mode space. An auxiliary estimator 240 estimates a respective auxiliary error for each auxiliary encoded texture block generated by the auxiliary generator 230. In an embodiment, the multi-mode encoder 200 comprises a separate default estimator 220 and a separate auxiliary estimator 240 as indicated in the figure. Alternatively, a single error estimator can replace the default estimator 220 and the auxiliary estimator 240 and thereby calculates the default and auxiliary errors for the generated default and auxiliary encoded texture blocks.

A block selector 250 of the multi-mode encoder 200 is configured to select an encoded texture block resulting in a smallest error from the default encoded texture block(s) generated by the default generator 210 and the auxiliary encoded texture block(s) generated by the auxiliary generator 230. The selection performed by the block selector 250 is based on the default error(s) estimated by the default estimator 220 and the auxiliary error(s) estimated by the auxiliary estimator 240.

The units 210, 220, 230, 240 and 250 of the multi-mode encoder 200 may be provided as software, hardware or a combination thereof. The units 210, 220, 230, 240 and 250 may be implemented together in the multi-mode encoder 200. Alternatively, a distributed implementation is also possible with some of the units provided elsewhere in a user terminal.

Figure 16:
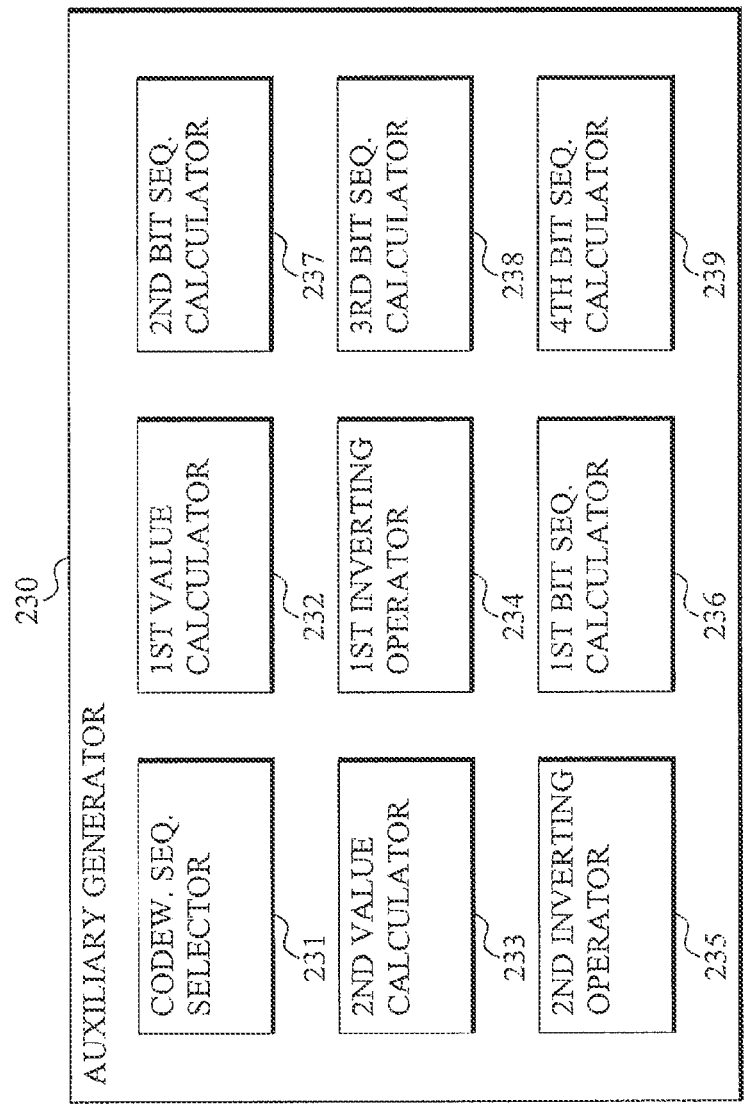
FIG. 16 is a schematic block diagram of the auxiliary generator of FIG. 15 according to an embodiment.

FIG. 16 is a schematic block diagram of an embodiment of the auxiliary generator 230 in FIG. 15. The auxiliary generator 230 comprises a codeword sequence selector 231 configured to select a codeword sequence B of $N_{p_X}+N_{q_X}+N_{p_Y}+N_{q_Y}-1$ bits. A first value calculator 232 is configured to calculate a first value $t_p$ based on the codeword sequence selected by the codeword sequence selector 231 and the number of bits of the first bit sequence and the number of bits of said third sequence. In an embodiment the first value calculator calculates the first value as $t_p=B\&(2^f-1)$.

The auxiliary generator 230 also comprises a second value calculator 233 configured to calculate a second value $t_q$ based on the codeword sequence selected by the codeword sequence selector 231, the number of bits of the first bit sequence and the number of bits of the third bit sequence. The second value calculator 233 preferably calculates the second value as $t_q=(B>>(N_{q_X}+N_{q_Y}))\&(2^h-1)$.

A first inverting operator 234 is configured to calculate a first bitwise inverted value $NOT(t_p)$ based on the first value and a second inverting operator 235 is configured to calculate a second bitwise inverted value $NOT(t_q)$ based on said second value.

The auxiliary generator 230 further comprises a first bit sequence calculator 236 configured to calculate the first bit sequence based on the first value and the number of bits of the first bit sequence, preferably as $t_p\&(2^g-1)$, if the first value is equal to or smaller than the second value and otherwise calculate the first bit sequence based on the first bitwise inverted value and the number of bits of the first bit sequence, preferably as $NOT(t_p)\&(2^g-1)$.

A second bit sequence calculator 237 is configured to calculate the second bit sequence based on the first value and the number of bits of said the second bit sequence. The second bit sequence calculator 237 preferably calculates the second bit sequence as $t_p>>N_{p_X}$ if the first value calculated by the first value calculator 232 is equal to or smaller than the second value calculated by the second value calculator 233 and otherwise calculates the second bit sequence based on the first bitwise inverted value and the number of bits of the first bit sequence, $NOT(t_p)>>N_{p_X}$.

A third bit sequence calculator 238 is configured to calculate, if the first value is equal to or smaller than the second value, the third bit sequence based on the second value and the number of bits of the second bit sequence, preferably as $t_q\&(2^l-1)$. If the first value is larger than the second value, the third bit sequence calculator 238 instead calculates the third bit sequence based on the second bitwise inverted value and the number of bits of the second bit sequence, preferably as $NOT(t_q)\&(2^l-1)$.

The auxiliary generator 230 additionally comprises a fourth bit sequence calculator 239 configured to calculate, if the first value is equal to or smaller than the second value, the fourth bit sequence based on the second value and the number of bits of the second bit sequence. The fourth bit sequence calculator 239 preferably the calculates the fourth bit sequence as $t_q>>N_{q_X}$. However, if the first value is larger than the second value the fourth bit sequence calculator 239 calculates the fourth bit sequence based on the second bitwise inverted value and the number of bits of the second bit sequence, preferably as $NOT(t_q)>>N_{q_X}$.

The units 231 to 239 of the auxiliary generator 230 may be provided as software, hardware or a combination thereof. The units 231 to 239 may be implemented together in the auxiliary generator 230. Alternatively, a distributed implementation is also possible with some of the units provided elsewhere in the multi-mode encoder.

Figure 17:
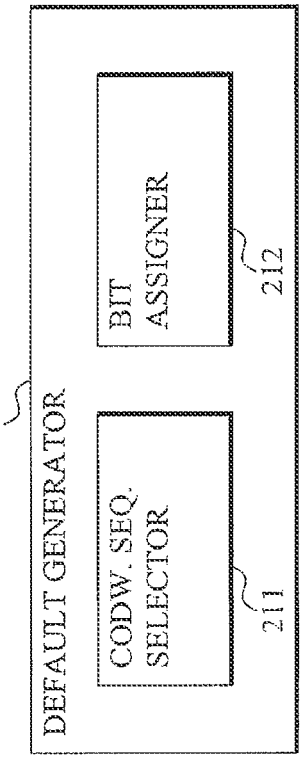
FIG. 17 is a schematic block diagram of the default generator of FIG. 15 according to an embodiment.

FIG. 17 is a schematic block diagram of an embodiment of the default generator 210 of the multi-mode encoder in FIG. 15. The default generator 210 comprises a codeword sequence selector 211 configured to select a codeword sequence of $N_{p_X}+N_{q_X}+N_{p_Y}+N_{q_Y}$ bits from the default mode space. These $N_{p_X}+N_{q_X}+N_{p_Y}+N_{q_Y}$ bits are processed by a bit assigner 212 that is configured to assign $N_{p_X}$ bits of the codeword sequence as the first bit sequence, assign $N_{q_X}$ bits of the codeword sequence as the second bit sequence, assign $N_{p_Y}$ bits of the codeword sequence as the third bit sequence and assign $N_{q_Y}$ bits of the codeword sequence as the fourth bit sequence.

The units 211 and 212 of the default generator 210 may be provided as software, hardware or a combination thereof. The units 211 and 212 may be implemented together in the default generator 210. Alternatively, a distributed implementation is also possible with some of the units provided elsewhere in the multi-mode encoder.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A multi-mode method of encoding a texture block comprising multiple texels, each texel having a respective texel value, said method comprising:
 defining an auxiliary mode space encompassing bit sequence combinations of a first bit sequence, a second bit sequence, a third bit sequence and a fourth bit sequence where i) an integer value represented by said third bit sequence is larger than an integer value represented by said fourth bit sequence, or ii) said integer value represented by said third bit sequence is equal to said integer value represented by said fourth bit sequence and an integer value represented by said first bit sequence is larger than an integer value represented by said second bit sequence, or iii) said integer value represented by said third bit sequence is equal to said integer value represented by said fourth bit sequence, said integer value represented by said first bit sequence is equal to said integer value represented by said second bit sequence and said integer value represented by said third bit sequence is within a predefined value interval;
 defining a default mode space being complementary to said auxiliary mode space and encompassing bit sequence combinations of said first bit sequence, said second bit sequence, said third bit sequence and said fourth bit sequence not encompassed by said auxiliary mode space;
 generating at least one default encoded texture block by representing said texture block with a respective combination of said first bit sequence, said second bit sequence, said third bit sequence and said fourth bit sequence selected from said default mode space;
 estimating, for each default encoded texture block of said at least one default encoded texture block, a default error indicative of representing said texture block with said default encoded texture block;
 generating at least one auxiliary encoded texture block by representing said texture block with a respective combination of said first bit sequence, said second bit sequence, said third bit sequence and said fourth bit sequence selected from said auxiliary mode space;
 estimating, for each auxiliary encoded texture block of said at least one auxiliary encoded texture block, an auxiliary error indicative of representing said texture block with said auxiliary encoded texture block; and
 selecting an encoded texture block resulting in a smallest error from said at least one default encoded texture block and said at least one auxiliary encoded block based on said at least one default error and said at least one auxiliary error.

2. The method according to claim 1, wherein generating said at least one auxiliary encoded texture block comprises:
 selecting a codeword sequence B of $N_{p_X}+N_{q_X}+N_{p_Y}+N_{q_Y}-1$ bits, wherein $N_{p_X}$ represents the number of bits of said first bit sequence, $N_{q_X}$ represents the number of bits of said second bit sequence, $N_{p_Y}$ represents the number of bits of said third bit sequence and $N_{q_Y}$ represents the number of bits of said fourth bit sequence;
 determining $t_p=B\&(2^f-1)$, wherein $f=N_{p_X}+N_{p_Y}$ and & denotes a bitwise AND operation;
 determining $t_q=(B>>(N_{q_X}+N_{q_Y}))\&(2^h-1)$, wherein $h=N_{q_X}+N_{q_Y}-1$ and >> denotes a right shift operation;
 determining said first bit sequence to be $t_p\&(2^g-1)$ if $t_p \le t_q$ and otherwise determining said first bit sequence to be $NOT(t_p)\&(2^g-1)$, wherein NOT( ) denotes a bitwise inverting operation and $g=N_{p_X}$;
 determining said second bit sequence to be $t_p>>N_{p_X}$ if $t_p \le t_q$ and otherwise determining said second bit sequence to be $NOT(t_p)>>N_{p_X}$;
 determining said third bit sequence to be $t_q\&(2^l-1)$ if $t_p \le t_q$ and otherwise determining said third bit sequence to be $NOT(t_q)\&(2^l-1)$, wherein $l=N_{q_X}$; and
 determining said fourth bit sequence to be $t_q>>N_{q_X}$ if $t_p \le t_q$ and otherwise determining said fourth bit sequence to be $NOT(t_q)>>N_{q_X}$, wherein a combination of said first bit sequence, said second bit sequence, said third bit sequence and said fourth bit sequence belong to said auxiliary mode space.

3. The method according to claim 1, wherein generating said at least one default encoded texture block comprises:
 selecting a codeword sequence of $N_{p_X}+N_{q_X}+N_{p_Y}+N_{q_Y}$ bits from said default mode space, wherein $N_{p_X}$ represents the number of bits of said first bit sequence, $N_{q_X}$ represents the number of bits of said second bit sequence, $N_{p_Y}$ represents the number of bits of said third bit sequence and $N_{q_Y}$ represents the number of bits of said fourth bit sequence;
 assigning $N_{p_X}$ bits of said codeword sequence as said first bit sequence;
 assigning $N_{q_X}$ bits of said codeword sequence as said second bit sequence;
 assigning $N_{p_Y}$ bits of said codeword sequence as said third bit sequence; and
 assigning $N_{q_Y}$ bits of said codeword sequence as said fourth bit sequence.

4. A multi-mode encoder for encoding a texture block comprising multiple texels, each texel having a respective texel value, wherein said multi-mode encoder comprises:
 an auxiliary generator circuit configured to generate at least one auxiliary encoded texture block by representing said texture block with a respective combination of a first bit sequence, a second bit sequence, a third bit sequence and a fourth bit sequence selected from an auxiliary mode space encompassing bit sequence combinations of said first bit sequence, said second bit sequence, said third bit sequence and said fourth bit sequence where i) an integer value represented by said third bit sequence is larger than an integer value represented by said fourth bit sequence, or ii) said integer value represented by said third bit sequence is equal to said integer value represented by said fourth bit sequence and an integer value represented by said first bit sequence is larger than an integer value represented by said second bit sequence, or iii) said integer value represented by said third bit sequence is equal to said integer value represented by said fourth bit sequence, said integer value represented by said first bit sequence is equal to said integer value represented by said second bit sequence and said integer value represented by said third bit sequence is within a predefined value interval;

an auxiliary estimator circuit configured to estimate, for each auxiliary encoded texture block of said at least one auxiliary encoded texture block generated by said auxiliary generator, an auxiliary error indicative of representing said texture block with said auxiliary encoded texture block;

a default generator circuit configured to generate at least one default encoded texture block by representing said texture block with a respective combination of said first bit sequence, said second bit sequence, said third bit sequence and said fourth bit sequence selected from a default mode space being complementary to said auxiliary mode space and encompassing bit sequence combinations of said first bit sequence, said second bit sequence, said third bit sequence and said fourth bit sequence not encompassed by said auxiliary mode space;

a default estimator circuit configured to estimate, for each default encoded texture block of said at least one default encoded texture block generated by said default generator circuit, a default error indicative of representing said texture block with said default encoded texture block; and a block selector circuit configured to select an encoded texture block resulting in a smallest error from said at least one default encoded texture block generated by said default generator circuit and said at least one auxiliary encoded block generated by said auxiliary generator circuit based on said at least one default error estimated by said default estimator circuit and said at least one auxiliary error estimated by said auxiliary estimator circuit.

5. The multi-mode encoder according to claim 4, wherein said auxiliary generator circuit comprises:

a codeword sequence selector circuit configured to select a codeword sequence B of $N_{p_X}+N_{q_X}+N_{p_Y}+N_{q_Y}-1$ bits, wherein $N_{p_X}$ represents the number of bits of said first bit sequence, $N_{q_X}$ represents the number of bits of said second bit sequence, $N_{p_Y}$ represents the number of bits of said third bit sequence and $N_{q_Y}$ represents the number of bits of said fourth bit sequence;

a first value calculator circuit configured to calculate a first value $t_p$ based on said codeword sequence selected by said codeword sequence selector, said number of bits of said first bit sequence, and said number of bits of said third sequence, $t_p=B\&(2^f-1)$, wherein $f=N_{p_X}+N_{p_Y}$ and & denotes a bitwise AND operation;

a second value calculator circuit configured to calculate a second value $t_q$ based on said codeword sequence selected by said codeword sequence selector, said number of bits of said first bit sequence and said number of bits of said third bit sequence, $t_q=(B>>(N_{q_X}+N_{q_Y}))\&(2^h-1)$, wherein >> denotes a right shift operation and $h=N_{q_X}+N_{q_Y}-1$;

a first inverting operator circuit configured to calculate a first bitwise inverted value $NOT(t_p)$ based on said first value, wherein NOT( ) denotes a bitwise inverting operation;

a second inverting operator circuit configured to calculate a second bitwise inverted value $NOT(t_q)$ based on said second value;

a first bit sequence calculator circuit configured to calculate said first bit sequence based on said first value and said number of bits of said first bit sequence, $t_p\&(2^g-1)$, $g=N_{p_X}$, if said first value is equal to or smaller than said second value, and otherwise calculate said second bit sequence based on said first bitwise inverted value and said number of bits of said first bit sequence, $NOT(t_p)\&(2^g-1)$;

a second bit sequence calculator circuit configured to calculate said second bit sequence based on said first value and said number of bits of said first bit sequence, $t_p>>N_{p_X}$, if said first value is equal to or smaller than said second value, and otherwise calculate said first bit sequence based on said first bitwise inverted value and said number of bits of said first bit sequence, $NOT(t_p)>>N_{p_X}$;

a third bit sequence calculator circuit configured to calculate said third bit sequence based on said second value and said number of bits of said second bit sequence, $t_q\&(2^l-1)$, $l=N_{q_X}$, if said first value is equal to or smaller than said second value, and otherwise calculate said fourth bit sequence based on said second bitwise inverted value and said number of bits of said second bit sequence, $NOT(t_q)\&(2^l-1)$; and a fourth bit sequence calculator circuit configured to calculate said fourth bit sequence based on said second value and said number of bits of said second bit sequence, $t_q>>N_{q_X}$, if said first value is equal to or smaller than said second value, and otherwise calculate said third bit sequence based on said second bitwise inverted value and said number of bits of said second bit sequence, $NOT(t_q)>>N_{q_X}$, wherein a combination of said first bit sequence, said second bit sequence, said third bit sequence and said fourth bit sequence belongs to said auxiliary mode space.

6. The multi-mode encoder according to claim 4, wherein the default generator circuit comprises:

a codeword sequence selector circuit configured to select a codeword sequence of $N_{p_X}+N_{q_X}+N_{p_Y}+N_{q_Y}$ bits from said default mode space, wherein $N_{p_X}$ represents the number of bits of said first bit sequence, $N_{q_X}$ represents the number of bits of said second bit sequence, $N_{p_Y}$ represents the number of bits of said third bit sequence and $N_{q_Y}$ represents the number of bits of said fourth bit sequence; and a bit assigner circuit configured to assign $N_{p_X}$ bits of said codeword sequence as said first bit sequence, assign $N_{q_X}$ bits of said codeword sequence as said second bit sequence, assign $N_{p_Y}$ bits of said codeword sequence as said third bit sequence and assign $N_{q_Y}$ bits of said codeword sequence as said fourth bit sequence.

* * * * *